(12) United States Patent
Winograd et al.

(10) Patent No.: US 8,838,978 B2
(45) Date of Patent: Sep. 16, 2014

(54) CONTENT ACCESS MANAGEMENT USING EXTRACTED WATERMARK INFORMATION

(75) Inventors: Joseph M. Winograd, San Diego, CA (US); Rade Petrovic, San Diego, CA (US); Jian Zhao, Montrose, CA (US)

(73) Assignee: Verance Corporation, San Diego, CA (US)

( * ) Notice: Subject to any disclaimer, the term of this patent is extended or adjusted under 35 U.S.C. 154(b) by 291 days.

(21) Appl. No.: 13/080,598

(22) Filed: Apr. 5, 2011

(65) Prior Publication Data

US 2012/0072730 A1    Mar. 22, 2012

Related U.S. Application Data

(60) Provisional application No. 61/383,693, filed on Sep. 16, 2010.

(51) Int. Cl.
*H04L 9/32* (2006.01)

(52) U.S. Cl.
USPC .......................................................... 713/176

(58) Field of Classification Search
CPC ............................................. H04L 2201/3246
USPC .......................................................... 713/176
See application file for complete search history.

(56) References Cited

U.S. PATENT DOCUMENTS

| | | | |
|---|---|---|---|
| 3,406,344 A | 10/1968 | Hopper | |
| 3,842,196 A | 10/1974 | Loughlin | |
| 3,885,217 A | 5/1975 | Cintron | |
| 3,894,190 A | 7/1975 | Gassmann | |
| 3,919,479 A | 11/1975 | Moon et al. | |
| 3,973,206 A | 8/1976 | Haselwood et al. | |
| 4,048,562 A | 9/1977 | Haselwood et al. | |
| 4,176,379 A | 11/1979 | Wessler et al. | |
| 4,199,788 A | 4/1980 | Tsujimura | |

(Continued)

FOREIGN PATENT DOCUMENTS

| CA | 2276638 A1 | 1/2000 |
|---|---|---|
| EP | 282734 A1 | 9/1988 |

(Continued)

OTHER PUBLICATIONS

Adelsbach, A., et al., "Proving Ownership of Digital Content," Proc. 3rd Int. Workshop on Information Hiding, LNCS vol. 1768, Sep./Oct. 1999, pp. 117,133.

(Continued)

*Primary Examiner* — Dant Shaifer Harriman
(74) *Attorney, Agent, or Firm* — Perkins Coie LLP; Donald L. Wenskay

(57) ABSTRACT

Methods, devices, and computer program products facilitate the application of a content use policy based on watermarks that are embedded in a content. Watermark extraction and content screening operations, which can include the application of content usage enforcement actions, may be organized such that some or all of the operations can be conducted at different times by different devices. These operations can be conducted by one or more trusted devices that reside in a networked environment. Real-time access to a content can also be facilitated by utilizing existing watermark extraction records. To facilitate real-time access to the content, the extraction records may contain segmented authentication information that correspond to particular segments of the content that is being accessed. Additionally, or alternatively, new watermark extraction operations can be conducted in real-time to produce new watermark extraction records.

44 Claims, 10 Drawing Sheets

(56) References Cited

U.S. PATENT DOCUMENTS

| | | |
|---|---|---|
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |

(56) References Cited

U.S. PATENT DOCUMENTS

| | | | |
|---|---|---|---|
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,353,974 B1 | 3/2002 | Graf |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,908 B1 | 6/2004 | Vogel |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,823,455 B1 * | 11/2004 | Macy et al. ................ 713/176 |
| 6,829,368 B2 | 12/2004 | Meyer et al. |
| 6,829,582 B1 | 12/2004 | Barsness |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 * | 9/2005 | Epstein ..................... 713/176 |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |

(56) References Cited

U.S. PATENT DOCUMENTS

| | | |
|---|---|---|
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 * | 9/2006 | Ripley et al. .................. 713/176 |
| 7,113,613 B2 | 9/2006 | Echizen et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,389,421 B2 | 6/2008 | Kirovski et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 * | 4/2010 | Schumann et al. ............ 713/189 |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,055,013 B2 | 11/2011 | Levy et al. |
| 8,059,815 B2 | 11/2011 | Lofgren et al. |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,346,532 B2 | 1/2013 | Chakra et al. |
| 8,467,717 B2 | 6/2013 | Croy et al. |
| 8,589,969 B2 | 11/2013 | Falcon |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071669 A1 | 3/2005 | Medvinsky et al. |
| 2005/0120220 A1 | 6/2005 | Oostveen et al. |

(56) References Cited

U.S. PATENT DOCUMENTS

| | | |
|---|---|---|
| 2005/0144632 A1 | 6/2005 | Mears et al. |
| 2005/0154891 A1 | 7/2005 | Skipper |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0228733 A1 | 9/2008 | Davis et al. |
| 2008/0273861 A1 | 11/2008 | Yang et al. |
| 2008/0298632 A1 | 12/2008 | Reed |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1* | 7/2009 | Yoshida ............ 707/100 |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0034513 A1 | 2/2010 | Nakano et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1* | 6/2010 | Haga et al. ............ 726/2 |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 | 8/2012 | Villette et al. |
| 2012/0265735 A1 | 10/2012 | McMillan et al. |
| 2012/0300977 A1 | 11/2012 | Petrovic et al. |
| 2013/0007462 A1 | 1/2013 | Petrovic et al. |
| 2013/0011006 A1 | 1/2013 | Petrovic et al. |
| 2013/0031579 A1 | 1/2013 | Klappert |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |

FOREIGN PATENT DOCUMENTS

| | | |
|---|---|---|
| EP | 372601 A1 | 6/1990 |
| EP | 581317 A2 | 2/1994 |
| EP | 2166725 A1 | 3/2010 |
| GB | 2260246 A | 4/1993 |
| GB | 2292506 A | 2/1996 |
| GB | 2363027 A | 12/2001 |
| JP | 10-150548 A | 6/1998 |
| JP | 11-086435 A | 3/1999 |
| JP | 11-284516 A | 10/1999 |
| JP | 11-346302 A | 12/1999 |
| JP | 2000-069273 A | 3/2000 |
| JP | 2000-174628 A | 6/2000 |
| JP | 2000163870 A | 6/2000 |
| JP | 2001022366 A | 1/2001 |
| JP | 2001-119555 A | 4/2001 |
| JP | 2001-188549 A | 7/2001 |
| JP | 2001-216763 A | 8/2001 |
| JP | 2001-218006 A | 8/2001 |
| JP | 2001245132 A | 9/2001 |
| JP | 2001257865 | 9/2001 |
| JP | 2001-312570 A | 11/2001 |
| JP | 2001-527660 A | 12/2001 |
| JP | 2001339700 | 12/2001 |
| JP | 2002-010057 A | 1/2002 |
| JP | 2002-024095 A | 1/2002 |
| JP | 2002-027223 A | 1/2002 |
| JP | 2002-091465 A | 3/2002 |
| JP | 2002091712 A | 3/2002 |
| JP | 2002100116 | 4/2002 |
| JP | 2002125205 | 4/2002 |
| JP | 2002135557 A | 5/2002 |
| JP | 2002-165191 A | 6/2002 |
| JP | 2002176614 A | 6/2002 |
| JP | 2002-519916 A | 7/2002 |
| JP | 2002-232693 A | 8/2002 |
| JP | 2002319924 A | 10/2002 |
| JP | 2002354232 A | 12/2002 |
| JP | 2003-008873 A | 1/2003 |
| JP | 2003-039770 A | 2/2003 |
| JP | 2003-091927 A | 3/2003 |
| JP | 2003-230095 A | 8/2003 |
| JP | 2003-244419 A | 8/2003 |
| JP | 2003-283802 A | 10/2003 |
| JP | 2003316556 A | 11/2003 |
| JP | 2003348324 | 12/2003 |
| JP | 2004-023786 A | 1/2004 |
| JP | 2004070606 A | 3/2004 |
| JP | 2004-163855 A | 6/2004 |
| JP | 2004-193843 A | 7/2004 |
| JP | 2004194233 A | 7/2004 |
| JP | 2004-328747 A | 11/2004 |
| JP | 2004328747 | 11/2004 |

(56) References Cited

FOREIGN PATENT DOCUMENTS

| | | | |
|---|---|---|---|
| JP | 2005051733 A | 2/2005 | |
| JP | 2005-094107 A | 4/2005 | |
| JP | 2005525600 A | 8/2005 | |
| JP | 20080539669 | 11/2008 | |
| JP | 20100272920 | 12/2010 | |
| JP | 5283732 | 7/2013 | |
| KR | 20100009384 A | 1/2010 | |
| WO | 94-10771 | 5/1994 | |
| WO | 95-14289 | 5/1995 | |
| WO | 97-09797 | 3/1997 | |
| WO | 97-33391 | 9/1997 | |
| WO | 98-53565 | 11/1998 | |
| WO | 99-03340 | 1/1999 | |
| WO | 99-39344 | 5/1999 | |
| WO | 99-45706 | 10/1999 | |
| WO | 99-62022 | 12/1999 | |
| WO | 00-00969 | 1/2000 | |
| WO | 00-13136 | 3/2000 | |
| WO | 00-56059 | 9/2000 | |
| WO | 01-54035 | 7/2001 | |
| WO | 01-55889 | 8/2001 | |
| WO | 0197128 A1 | 12/2001 | |
| WO | 02-23883 | 3/2002 | |
| WO | 0219589 A1 | 3/2002 | |
| WO | 03-052598 | 6/2003 | |
| WO | 2003102947 | 12/2003 | |
| WO | 2005017827 | 2/2005 | |
| WO | 2005-027501 | 3/2005 | |
| WO | 2005038778 A1 | 4/2005 | |
| WO | 2006051043 A1 | 5/2006 | |
| WO | 2006116394 A2 | 11/2006 | |
| WO | 2010073236 A1 | 7/2010 | |
| WO | 2013067439 A1 | 5/2013 | |
| WO | 2013090462 A1 | 6/2013 | |
| WO | 2013090466 A1 | 6/2013 | |
| WO | 2013090467 A1 | 6/2013 | |

OTHER PUBLICATIONS

Advanced Access Content System (AACS), Pre-recorded Video Book, Revision 0.951, Sep. 28, 2009, 88 pages total.
Aggarwal, et al., "Multi-Layer Grid Embeddings," IEEE, 1985, pp. 186-196.
"Audio Watermarking System to Screen Digital Audio Content for LCM Acceptance," Aris Technologies, Inc., May 23, 1999.
Barreto, et al. "Toward Secure Public-Key Blockwise Fragile Authentication Watermarking", IEEE Proceedings—Vision, Image, and Signal Processing—Apr. 2002, vol. 149, Issue 2, p. 57-62.
Boney, L., et al., "Digital Watermarks for Audio Signals," Dept. of Electrical Engineering, Univ. of Minnesota, Mar. 27, 1996.
Caronni, Germano,"Assuring Ownership Rights for Digital Images", Proceedings of 'reliable IT systems' VIS 95, H.H. Bruggermann and W. Gerhardt-Hackl (Ed.), Vieweg Publishing Company, Germany, 1995.
Chen, B. and G.W. Wornell, "Quantization index modulation: a class of provably good methods for digital watermarking and information embedding," IEEE Transactions on Information Theory, vol. 47, No. 4, pp. 1423-1443, 2001.
Chou, J. et al., "A Robust Optimization Solution to the Data Hiding Problem using Distributed Source Coding Principles", Pro. SPIE, Vol. 3971, San Jose, CA (Jan. 2000) (10 pages).
Chou, J., et al., "A Robust Blind Watermarking Scheme based on Distributed Source Coding Principles", ACM Multimedia 2000 Los Angeles, CA USA.
Cinea Inc., "Forensic watermarking", 2004. [http://www.cinea.com/whitepapers/forensic_watermarking.pdf] (9 pages).
International Search Report for PCT Application No. PCT/US98/09587 dated Aug. 14, 1998.
International Search Report for PCT Application No. PCT/US01/26505 dated Feb. 14, 2002.
International Search Report for PCT Application No. PCT/US03/31816 dated May 19, 2004.
International Search Report for PCT Application No. PCT/US06/31267 dated Aug. 22, 2007.
International Search Report for PCT/US2006/015615 dated Jan. 4, 2008.
International Search Report for PCT Application No. PCT/US06/25090 dated May 13, 2008.
International Search Report for PCT Application No. PCT/US06/15410 dated May 29, 2008.
International Search Report for PCT Application No. PCT/US07/16812 dated Sep. 26, 2008.
M. Costa, "Writing on Dirty Paper" IEEE Trans. on Info. Theory, IT-29, No. 3, pp. 439-441 (May 1983) (3 pages).
Cox, I. J. and J. P. M. G. Linnartz, "Some General Methods for Tampering with Watermarks" IEEE Journal on Selected Areas in Communications, vol. 16, No. 4, May 1998, pp. 587-593.
Coxford, A., et al., "Advanced Mathematics: A Preparation for Calculus, Second Edition," 1978, pp. 35-46.
Davidson, M.F., "Music File Filter," Sony Music, New York, May 23, 1999.
Das, et al., "Distributed Priority Queues on Hybercube Architectures," IEEE, 1996, pp. 620-627.
Digimarc® Watermarking Guide, © 1999 Digimarc Corporation, 22 pages.
Dittmann, J., "Combining digital watermarks and collusion secure fingerprints for digital images," Proc. SPIE vol. 3657: Security and Watermarking of Multimedia Contents, Jan. 1999, pp. 171-182.
Dittmann, J., "Combining digital watermarks and collusion secure fingerprints for customer copy monitoring", Proc. IEEE Seminar on Secure Images and Image Authentication, Apr. 2000, pp. 6/1-6/6.
Epp et al., "Generalized Scattering Matrices for Unit Cell Characterization of Grid Amplifiers and Device De-Embedding", IEEE vol. 2, Jun. 1995, pp. 1288-1291.
European Search Report for European Application No. 03774648.4 dated Nov. 10, 2010.
Furon, T. and P. Duhamel, "An asymmetric watermarking method", IEEE Trans. Signal Processing, vol. 51, No. 4, Apr. 2003, pp. 981-995.
Guth, H.J., et al., "Error- and Collusion-Secure Fingerprinting for Digital Data," Proc. 3rd Int. Workshop on Information Hiding, LNCS vol. 1768, Sep./Oct. 1999, pp. 134-145.
Hartung, F., et al., "Watermarking of MPEG-2 encoded video without decoding and re-coding," Proc. SPIE vol. 3020: Multimedia Computing and Networking 97, Feb. 1997, pp. 264-274.
Hartung, F., et al., "Digital Watermarking of MPEG-2 Coded Video in the Bitstream Domain," Proc. IEEE Int. Conf. on Acoustics, Speech and Signal Processing, Apr. 1997, pp. 2621-2624.
Hartung, F., et al., "Watermarking of uncompressed and compressed video," Signal Processing, vol. 66, May 1998, pp. 283-301.
Heegard, C. et al., "On the Capacity of Computer Memory with Defects", IEEE Trans. Info. Theory, vol. IT-29, No. 5, pp. 731-739 (Sep. 1983) (9 pages).
Jacobsmeyer, Jay, "Introduction to Error-Control Coding," Pericle Communications Company, 2004 (16 pages).
Kalker, T., "A security risk for publicly available watermark detectors", Proc. Benelux Info. Theory Symp., Veldhoven, The Netherlands, May 1998.
Kalker T., "System Issues in Digital Image and Video Watermarking for Copy Protection," Proc. IEEE Int. Conf. on Multimedia Computing and Systems, Jun. 1999, pp. 562-567.
Kang et al, "A DWT-DFT Composite Watermarking Scheme Robust to 80th Affine Transform and JPEG Compression", IEEE Transactions on Circuits and Systems for Video Technology, vol. 13, No. 8, Aug. 2003.
Kim, T.Y., et al. "An Asymmetric Watermarking System With Many Embedding Watermarks Corresponding to One Detection Watermark", IEEE signal processing letters, vol. 11, No. 3, Mar. 2004.
Kirovski et al., "Multimedia Content Screening using a Dual Watermarking and Fingerprinting System", Proceedings of the tenth ACM international conference, pp. 372-381, 2002.
D. Kirovski and F.A.P. Petitcolas, "The blind pattern matching attack on watermark systems," IEEE Trans. Signal Processing, Apr. 2003.
Kirovski et al., "Randomizing the replacement attack", ICASSP, 2004, pp. 381-384.

(56) References Cited

OTHER PUBLICATIONS

Kirovski, et al., "Multimedia Content Screening using a Dual Watermarking and Fingerprinting System", Tech. Rep. MSR-TR-2001-57, Microsoft Research Jun. 2001).

Kocher, P., et al., "Self-Protecting Digital Content: A Technical Report from the CRI Content Security Research Initiative," Cryptography Research, Inc. (CRI), 2002-2003 pp. 1-14.

Kutter, et al., "The watermark copy attack", Proc. of the SPIE: Security and Watermarking of Multimedia Content II, vol. 3971, Jan. 2000.

Kuznetsov, A.V. et al., "An Error Correcting Scheme for Defective Memory", IEEE Trans. Inf. Theory, vol. 4, No. 6, pp. 712-718 (Nov. 1978) (7 pages).

Lacy, C., et al., "Intellectual Property Protection Systems and Digital Watermarking," Proceedings: Information Hiding, Second International Workshop, Portland, OR, pp. 158-168, 1998.

Lin et al., "Detection of image alterations using semi-fragile watermarks", Proceedings of the SPIE International Conference on Security and Watermarking of Multimedia Contents II, vol. 3971, USA, Jan. 2000 (12 pages).

Lin, P.L., "Robust transparent image watermarking system with spatial mechanisms," The Journal of Systems and Software, vol. 50, Feb. 2000, pp. 107-116.

Lotspeich, J., "The Advanced Access Content System's Use of Digital Watermarking," MCPS '06, Oct. 28, 2006, pp. 19-21.

Lu, Chun-Shien et al., "Oblivious Cocktail Watermarking by Sparse Code Shrinkage: A Regional- and Global-Based Scheme", ICIP, 2000 (vol. III: 13-16).

Mason, A., et al., "User Requirements for Watermarking in Broadcast Applications", IEEE Conference Publication, International Broadcasting Convention (!BC 2000), Amsterdam, Sep. 8-12, 2000 (7 pages).

"Microsoft Response to CfP for Technology Solutions to Screen Digital Audio Content for LCM Acceptance," Microsoft Corp., May 23, 1999.

Mintzer, et al., "An Invisible Watermarking Technique for Image Verification," 1997, pp. 680-683.

Mintzer et al., "If one watermak is good, are more better?", Acoustics, Speech, and Signal Processing, 1999. ICASSP'99., Publication Date Mar. 15-19, 1999, vol. 4, on pp. 2067-2069.

Mobasseri. B.G .. et al. "Content Authentication and Tamper Detection in Digital Video". Image Processing. 2000. Proceedings. 2000 International Conference. vol. 1.2000. p. 458-461.

Moulin, P., et al., "Detection-Theoretic Analysis of Desynchronization Attacks in Watermarking, " Tech. Rep. MSR-TR-2002-24, Microsoft Research (Mar. 2002).

Muranoi, R., et al., "Video Retrieval Method using ShotID for Copyright Protection Systems," Proc. SPIE vol. 3527: Multimedia Storage and Archiving Systems III, Nov. 1998, pp. 245-252.

Nikolaidis et al., Watermark Detection: Benchmarking Perspectives, 2002 IEEE Conference on Multimedia and Expo (ICME 2002).

Office action dated Jul. 21, 2011 in Japanese Application 2008-508985.

Office Action dated Mar. 18, 2011 in European Application 03774648.4.

Park et al, "Robust and Fragile Watermarking Techniques for Documents Using Bidirectional Diagonal Profiles", Information and Communications Security: Third International Conference, ICICS 2001, Xian, China, Nov. 13-16, 2001, pp. 483-494.

Perez-Gonzalez, et al., "Approaching the capacity limit in image watermarking a perspective on coding techniques for data hiding applications", Signal Processing, vol. 81, No. 6, Jun. 2001, pp. 1215-1238 (24).

Petitcolas, F. A. P.., et al., "Attacks on Copyright Marking Systems" Second Workshop on Information Hiding, vol. 1525 of Lecture Notes in Computer Science, pp. 218-238, Apr. 1998.

Philips Research Liquid Audio Fraunhofer Institute, "Digital Audio Screening Technology for Phased Rollout," v. 1.0, May 23, 1999.

Pytlak, John P. "Anti-Piracy Coding," URL: http://www.tele.com/pipermail/tig/2003-November/003842.html; Nov. 13, 2003 (2 pages).

RSA Laboratory, "Frequently Asked Questions About Today's Cryptography," Version 4.1, May 2000, pp. 1; 20-33; 54-58; 74-75; 87-88; 101-102; 106-110 and 113-118.

Schneier, B., "Applied Cryptography, Second Edition: Protocols, Algorithms and Source Code in C," Oct. 1995, pp. 9-10, 29-31, 79-80.

Shih et al., "Combinational, image watermarking in the spatial and frequency domains", Pattern Recognition Society 36 pp. 969-975 (2002).

Solanki et ai, "Robust Image-Adaptive Data Hiding: Modeling, Source Coding, and Channel Coding", 41st AllertonConference on Communications, Control, and Computing, Oct. 2003.

Steinebach, M., et al., "StirMark Benchmark: Audio Watermarking Attacks", Int. Conference on Information Technology: Coding and Computing (ITCC 2001), Apr. 2-4, Las Vegas, Nevada, pp. 49-54, ISBN 0-7695-1062-0, 2001.

Tanaka, K., et al. "Secret transmission method of character data in motion picture communication", SPIE vol. 1605, Visual Communications and Image Processing '91, Visual Communication. pp. 646-649, 1991.

TASK AC122—Copy Protection for Distribution Services, Jul. 1, 1997, Http://acad.bg/WISE/english/rd/partners/acts/areal/ac122-t.html.

Tsai, et al., "Wavelet packet and adaptive spatial transformation of watermark for digital image authentication", IEEE, Image Processing, 2000, Proceedings. 2000 International Conference on, Publication Date: 2000, vol. 1, on pp. 450-453 vol. 1, abstract, p. 452, section 2, pp. 450-452, section 2.

Verance Corporation, "Confirmedia", PowerPoint presentation made to National Association of Broadcasters; Apr. 24, 2001 (40 pages).

Xu, C., et al., "Applications of digital watermarking technology in audio signals", J. Audio Eng. Soc., vol. 47, No. 10, pp. 805-812, Oct. 1999.

Yeung, et al., "An Invisible Watermarking Technique for Image Verification," 1997, pp. 680-683.

Zhao, J., "Applying Digital Watermarking Techniques to Online Multimedia Commerce," Proc. Int. Conf. on Imaging Science, Systems and Applications (CISSA'97), Jun./Jul. 1997, 7 pages.

Zhao, J. "A WWW Service to Embed and Prove Digital Copyright Watermarks," Proc. European Conf. on Multimedia Applications, Services and Techniques (ECMAST'96), May 1996, pp. 695-710.

International Search Report and Written Opinion dated Apr. 24, 2012 for International Application No. PCT/US2011/051857, filed Sep. 15, 2011 (9 pages).

International Search Report and Written Opinion dated Mar. 28, 2012 for International Application No. PCT/US2011/051855, filed Sep. 15, 2011 (8 pages).

"Content Protection—Self Protecting Digital Content," http://www.cryptography.com/technology/spdc/index.html, May 2010 (1 page).

Bangaleea, R., et al., "Performance improvement of spread spectrum spatial-domain watermarking scheme through diversity and attack characterisation," IEEE Africon, pp. 293-298, 2002.

Cappellini, V., et al. "Robust Frame-based Watermarking for Digital Video," Proceedings of the 12th International Workshop on Database and Expert Systems Applications, Sep. 2001 (5 pages).

European Search Report dated Apr. 12, 2012 for European Patent Application No. 07836262.1 filed Jul. 25, 2007 (12 pages).

European Search Report dated Jul. 3, 2012 for European Patent Application No. 12150742.0, filed Oct. 7, 2003 (5 pages).

European Search Report dated Oct. 24, 2012 for European Patent Application No. 06758537.2, filed Apr. 21, 2006 (6 pages).

European Search Report dated Oct. 31, 2012 for European Patent Application No. 06758577.8, filed Apr. 25, 2006 (6 pages).

European Search Report dated Nov. 8, 2012 for European Patent Application No. 06785709.4, filed Jun. 27, 2006 (5 pages).

International Search Report and Written Opinion dated Apr. 8, 2013 for International Application No. PCT/US2012/069306, filed Dec. 12, 2012 (12 pages).

(56) References Cited

OTHER PUBLICATIONS

International Search Report and Written Opinion dated Mar. 25, 2013 for International Application No. PCT/US2012/069302, filed Dec. 12, 2012 (22 pages).
International Search Report and Written Opinion dated Feb. 28, 2013 for International Application No. PCT/US2012/066138, filed Nov. 20, 2012 (11 pages).
International Search Report and Written Opinion dated Mar. 14, 2013 for International Application No. PCT/US2012/069308, filed Dec. 12, 2012 (10 pages).
International Search Report and Written Opinion dated Mar. 18, 2013 for International Application No. PCT/US2012/063431, filed Nov. 2, 2012 (10 pages).
Kirovski, D., et al., "Robust spread-spectrum audio watermarking," IEEE International Conference on Acoustics, Speech, and Signal Processing, 3:1345-1348, 2001.
Maehara, F., et al., "A proposal of multimedial home education terminal system based on flash-squeak OS," Technical report of the institute of image information and television engineers, 28(43): Jul. 21-24, 2004.
Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated May 8, 2012 for Japanese Patent Application No. 2009-522802 (4 pages).
Office Action dated Nov. 26, 2012 for Japanese Patent Application No. 2011-114667 (8 pages).
Office Action dated Nov. 28, 2012 for Japanese Patent Application No. 2011-114666 (8 pages).
Seok, J., et al., "A novel audio watermarking algorithm for copyright protection of digital audio," ETRI Journal, 24(3):181-189, Jun. 2002.
Wolfgang, R., et al., "Perceptual watermarks for digital images and video," Proceedings of the IEEE, 87(7):1108-1126, Jul. 1999.
Office Action dated May 1, 2013 for Japanese Patent Application No. 2011-114667 (6 pages).
"Civolution's 2nd screen synchronisation solution wins CSI product of the year 2011 award at IBC," IBC Press Release, Hall 2—Stand C30, Sep. 2011 (2 pages).
"Red Bee and Civolution develop companion app for FX UK," http://www.digitaltveurope.net/19981/red-bee-and-civolution-develop-companion-app-for-fx-uk, Jan. 2012 (2 pages).
Spangler, T., "Social Science," http://www.multichannel.com/content/social-science, Sep. 2011 (5 pages).
Wang, X., et al., "Robust correlation of encrypted attack traffic through stepping stones by manipulation of interpacket delays," Proceedings of the 10th ACM conference on computer communications security, Oct. 27-30, 2003, Washington D.C., USA.

\* cited by examiner

CONTENT ACCESS MANAGEMENT USING EXTRACTED WATERMARK INFORMATION

RELATED APPLICATIONS

This application claims priority from U.S. provisional application No. 61/383,693 filed on Sep. 16, 2010, which is incorporated herein by reference in its entirety for all purposes.

FIELD OF INVENTION

The present invention generally relates to the field of content management. More particularly, the disclosed embodiments relate to efficient and secure extraction of watermarks from media content to enable content management.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Digital watermarks have been proposed and used for copyright protection of signals such as audio, video, images and the like. In a typical watermarking scenario an auxiliary information signal is hidden within a host content in such a way that it is substantially imperceptible, and at the same time, difficult to remove without damaging the host content. The auxiliary information that is hidden within the host content can then allow content management to be carried out to varying degrees. In some embodiments, content management includes, but is not limited to, the management of the use of content in accordance with one or more policies. For example, the auxiliary information may merely convey that the host content is not allowed to be copied (i.e., a "no copy allowed" watermark). Once extracted and interpreted by a compliant device, copying of the content is prevented. A compliant device can include, but is not limited to, a device that performs screening, or otherwise operates in a manner consistent with a content use policy. Content use (or the uses of content) can include, but is not limited to, operations involving content such as playback, copy, record, transfer, stream, or other operations. Additionally, or alternatively, the embedded auxiliary information can identify the rightful owner(s), author(s) and/or author(s) of the content or can provide a serial number associated with the content or other content identifying information. The auxiliary information can also be used for other applications, such as to monitor the usage of the embedded host content, resolve ownership disputes, and keep track of royalties and the like.

In order to extract and utilize the watermarks embedded in various content, substantial resources such as CPU cycles, digital memory, and communication resources may be engaged. This, in turn, can delay access to the content, increase the cost of manufacturing devices that are designed with a minimum processing load objective, increase battery consumption in mobile devices, etc. The processing burden associated with extracting such watermarks is often exacerbated by a need to perform certain additional content transformation operations, such as decryption, decompression, de-multiplexing, etc., that are must be performed before watermark extraction can be attempted.

SUMMARY OF THE INVENTION

This section is intended to provide a summary of certain exemplary embodiments and is not intended to limit the scope of the embodiments that are disclosed in this application.

The disclosed embodiments improve the efficiency of watermark extraction and the associated processing by reducing the overall resource engagement, utilizing spare resources whenever possible, and distributing resource engagement in time to achieve low peak requirements and optimize cost-performance tradeoff. These and other features of the disclosed embodiments are effected while maintaining appropriate levels of security associated with the usage of watermarks. The disclosed embodiments further enhance the capabilities of connected (e.g., networked) devices to effect watermark extraction, content screening and content management through cooperative efforts. Watermark extraction and content screening operations, which can include the application of content usage enforcement actions, may be organized such that some or all of the operations can be conducted at different times by different devices. The disclosed embodiments further facilitate real-time access to a content by utilizing existing watermark extraction records. Further, the extraction records may contain segmented authentication information that correspond to particular segments of the content that is being accessed. Such segmented authentication information allow content authentication on-the-fly, as the content is being accessed. Additionally, or alternatively, new watermark extraction operations can be conducted in real-time to produce new watermark extraction records.

One aspect of the disclosed embodiments relates to a method that includes receiving a request for access to a content at a first device from a second device, where the first device operates in a network. This method further comprises performing device authentication to ascertain a trusted status associated with one or both of the first and second devices, and determining an operational configuration for performing watermark extraction and/or screening operations using of one or more trusted devices. In one embodiment, the second device is a trusted content client device, and the second device is configured to perform the watermark extraction and screening operations.

In another embodiment, the second device is also a trusted content client device. But in this embodiment, a trusted slave device is configured to perform the watermark extraction operation and provide information associated with the extraction information to the second device. Moreover, the second device is configured to perform the screening operation. In still another embodiment, where the second device is a trusted content client device, a trusted delegated device is configured to perform the watermark extraction and screening operations.

According to another embodiment, the first device is a trusted content server, and the first device is configured to perform the watermark extraction and screening operations. In another embodiment, the first device is similarly a trusted content server. However, in this embodiment, a trusted slave device is configured to perform the watermark extraction operation and provide information associated with the extraction information to the first device. Further, the first device is configured to perform the screening operation.

In another embodiment, where the first device is a trusted content server, a trusted delegated device is configured to perform the watermark extraction and screening operations.

In yet another embodiment, the first device is a trusted content server and the second device is a trusted content client device. According to this embodiment, the first device is configured to perform the watermark extraction operation and the second device is configured to perform the screening operation.

In another embodiment, where the first device is a trusted content server and the second device is a trusted content client device, the second device is configured to perform the watermark extraction operation. In this embodiment, the first device is configured to perform the screening operation.

According to one embodiment, the network in the above described method is a home network. For example, such a home network can be a digital living network alliance (DLNA) network. While in another embodiment, the second device also operates in the network, in another embodiment, the second device operates outside of the network.

According to one embodiment, the first device is a non-compliant device and the second device is a compliant device. In another embodiment, the first device is a compliant device but the second device is a non-compliant device. In still another embodiment, both the first and the second devices are non-compliant devices.

Another aspect of the disclosed embodiments relates to a device that includes a processor and a memory, including processor executable code. The processor executable code when executed by the processor configures the device to receive a request for access to a content at a first device from a second device, where the first device operates in a network. The processor executable code when executed by the processor also configures the device to perform device authentication to ascertain a trusted status associated with one or both of the first and the second devices. The processor executable code when executed by the processor further configures the device to determine an operational configuration for performing watermark extraction and/or screening operations using one or more trusted devices.

Another aspect of the disclosed embodiments relates to a computer program product that is embodied on a non-transitory computer readable medium. The computer program product comprises program code for receiving a request for access to a content at a first device from a second device, the first device operating in a network. The computer program product also includes program code for performing device authentication to ascertain a trusted status associated with one or both of the first and the second devices. The computer program product further includes program code for determining an operational configuration for performing watermark extraction and/or screening operations using one or more trusted devices.

Another aspect of the disclosed embodiments relates to a device that comprises means for receiving a request for access to a content at a first device from a second device, the first device operating in a network and means for performing device authentication to ascertain a trusted status associated with one or both of the first and the second devices. Such a device further includes means for determining an operational configuration for performing watermark extraction and/or screening operations using one or more trusted devices.

Another aspect of the disclosed embodiments relates to a method that comprises receiving a request for access to a content at a gateway device configured to coordinate operations of a plurality of devices within a network. Such a request is received from a second device for access to the content that is accessible to the first device, where the first device is configured to operate within the network. Such a method further includes coordinating, at the gateway device, device authentication to ascertain a trusted status associated with one or both of the first and second devices, and determining, at the gateway device, an operational configuration for performing watermark extraction and content screening operations using of one or more trusted devices.

In one embodiment, the second device is a device that is configured to operate within the network, while in another embodiment, with the second device is a device that is configured to operate outside of the network. In another embodiment, the gateway device is configured to communicate with the one or more trusted devices to commence the watermark extraction and/or screening operations. In another example, the gateway device is configured to revoke a trusted status of a device within the network. In still other examples, the gateway device is configured to retain a content use policy associated with embedded watermarks. In one variation, the gateway device is also configured to communicate the content use policy to various trusted devices.

Another aspect of the disclosed embodiments relates to a gateway device that comprises a processor, and a memory, comprising processor executable code. The processor executable code when executed by the processor configures the gateway device to receive a request for access to a content at the gateway device that is configured to coordinate operations of a plurality of devices within a network. The request is received from a second device for access to the content that is accessible to the first device, where the first device is configured to operate within the network. The processor executable code when executed by the processor further configures the gateway device to coordinate device authentication to ascertain a trusted status associated with one or both of the first and second devices. The processor executable code when executed by the processor also configures the gateway device to determine an operational configuration for performing watermark extraction and content screening operations using of one or more trusted devices.

Another aspect of the disclosed embodiments relates to a computer program product, embodied on a non-transitory computer readable medium, that comprises computer code for receiving a request for access to a content at the gateway device that is configured to coordinate operations of a plurality of devices within a network. The request is received from a second device for access to the content that is accessible to the first device, where the first device is configured to operate within the network. The computer program product also comprises computer code for coordinating device authentication to ascertain a trusted status associated with one or both of the first and second devices, and computer code for determining an operational configuration for performing watermark extraction and content screening operations using of one or more trusted devices.

Another aspect of the disclosed embodiments relates to a device that comprises means for transmitting a request for access to a content from a second device to a first device, the first device operating in a network. This device also includes means for performing device authentication to ascertain a trusted status associated with the first device, and means for determining an operational configuration for performing watermark extraction and/or screening operations using one or more trusted devices.

Another aspect of the disclosed embodiments relates to a method that includes transmitting a request for access to a content from a second device to a first device, the first device operating in a network. This method also includes performing device authentication to ascertain a trusted status associated with the first device, and determining an operational configuration for performing watermark extraction and/or screening operations using one or more trusted devices.

Another aspect of the disclosed embodiments relates to a device that comprises a processor and a memory, including processor executable code. The processor executable code when executed by the processor configures the device to transmit a request for access to a content from a second device to a first device, the first device operating in a network, and to perform device authentication to ascertain a trusted status associated with the first device. The processor executable code when executed by the processor further configures the device to determine an operational configuration for performing watermark extraction and/or screening operations using one or more trusted devices.

Another aspect of the disclosed embodiments relates to a computer program product that is embodied on a non-transitory computer readable medium. The computer program product includes program code for transmitting a request for access to a content from a second device to a first device, where the first device operates in a network. The computer program product also includes program code for performing device authentication to ascertain a trusted status associated with the first and device, and program code for determining an operational configuration for performing watermark extraction and/or screening operations using one or more trusted devices.

An aspect of the disclosed embodiments relates to a method that comprises receiving a device authentication certificate at a first device from a second device and verifying an authenticity of the certificate. This method also includes ascertaining capabilities of the second device and determining an operational configuration for conducting watermark extraction and/or screening operations associated with a content. In one embodiment, the certificate contains information indicative of at least a portion of the capabilities of the second device. In one example, the certificate is a digital transmission content protection over Internet protocol (DTCP-IP) certificate, and the information regarding the capabilities of the second device is carried as part of that DTCP-IP certificate. In another embodiment, at least a portion of the capabilities of the second device is ascertained from a source other than the certificate. For example, at least a portion of the capabilities of the second device can be received through an additional communication with the second device.

According to another embodiment, the ascertained capabilities of the second device includes a capability to conduct some or all of the watermark extraction operation and/or content screening operations. In such a scenario, the operational configuration can designate the second device to perform at least one of the watermark extraction and content screening operations. In another embodiment, the ascertained capabilities of the second device include a capability to grant computational and memory resources to other devices.

In one embodiment, the above-noted method further includes receiving a device authentication certificate at the second device from the first device, verifying the authenticity of the certificate received from the first device and ascertaining capabilities of the first device. In one variation, the certificate that is received from the first device contains information indicative of at least a portion of the capabilities of the first device. In one example, the certificate that is received from the first device is a digital transmission content protection over Internet protocol (DTCP-IP) certificate and the information regarding the capabilities of the first device is carried as part of that DTCP-IP certificate. In another example, at least a portion of the capabilities of the first device is ascertained from a source other than the certificate. For instance, at least a portion of the capabilities of the first device can be received through an additional communication with the first device. In another embodiment, the ascertained capabilities of the first device comprise a capability to conduct some or all of the watermark extraction and/or content screening operations.

In one embodiment, the ascertained capabilities of the first device comprise a capability to grant computational and memory resources to other devices. In one variation, the determination of the operational configuration for conducting watermark extraction and/or screening operations is conducted in accordance with the ascertained capabilities of the first device and the second device. In another embodiment, the operational configuration designates the first device to perform at least one of the watermark extraction and the content screening operations. In still another embodiment, the operational configuration designates the first and the second devices to collaboratively perform the watermark extraction and the content screening operations.

According to another embodiment, the operational configuration designates at least one of the first and the second devices to conduct the watermark extraction and content screening operations in accordance with a factor selected from the group consisting of: availability of computational resources, availability of watermark extraction and screening capabilities, integration complexity for a device manufacturer, consumer experience, processing performance, and an overall preference ranking. In one embodiment, at least one of the first and second devices are configured to operate in a home network. For example, such a home network can be a digital living network alliance (DLNA) network.

Another aspect of the disclosed embodiments relates to a device that includes a processor and a memory, including processor executable code The processor executable code when executed by the processor configures the device to receive a device authentication certificate at a first device from a second device and verify an authenticity of the certificate. The processor executable code when executed by the processor also configures the device to ascertain the capabilities of the second device and determine an operational configuration for conducting watermark extraction and/or screening operations associated with a content.

Another aspect of the disclosed embodiments relates to a computer program product that is embodied on a non-transitory computer readable medium. The computer program product comprises program code for receiving a device authentication certificate at a first device from a second device and program code for verifying an authenticity of the certificate. The computer program product also includes program code for ascertaining capabilities of the second device and program code for determining an operational configuration for conducting watermark extraction and/or screening operations associated with a content.

Another aspect of the disclosed embodiments relates to a device that comprises means for receiving a device authentication certificate at a first device from a second device and means for verifying an authenticity of the certificate. The device also includes means for ascertaining capabilities of the second device and means for determining an operational configuration for conducting watermark extraction and/or screening operations associated with a content.

Another aspect of the disclosed embodiments relates to a method that includes retrieving an existing watermark extraction record associated with a content in response to detection of an operation in a content handling device, where the operation requires access to a content. The method also comprises authenticating the content in accordance with the existing watermark extraction record and effecting content screening in accordance with a content use policy associated with the content. In one embodiment, the operation that requires access to the content can be at least one of: a copying operation, a transferring operation, a rendering operation, a playback operation and a recording operation.

In one embodiment, the existing watermark extraction record is retrieved from a location outside of the content handling device. In another embodiment such a location is at least one of: a private virtual locker on a cloud, a universal virtual locker on a cloud, a storage on a device that is compliant to DLNA (Digital Living Network Alliance) within a home network, a storage location within a digital living network alliance (DLNA) compliant network, a storage location within another device that is communicatively connected to the content handling device and a removable computer-readable storage medium. In another embodiment, the existing watermark extraction record is retrieved from the content handling device.

In another embodiment, the existing watermark extraction record comprises at least one of: an extracted watermark payload, a number of extracted watermarks, a time stamp associated with an extracted watermark payload, a content authentication information, a digital signature associated with the extraction record, a content use policy associated with the content, and an enforcement action associated with a content use policy and an extracted watermark payload.

In still another embodiment, at least one of the retrieval of the existing watermark extraction record and authentication of the content file fails, and the content is subjected to a new watermark extraction operation. In such an embodiment, the method can further include producing a new watermark extraction record. In such an embodiment, a content use policy can prescribe an enforcement action in accordance with a result of the new watermark extraction operation. For example, the prescribed enforcement action can be stored as part of the new watermark extraction record. In another embodiment, the content use policy prescribe an enforcement action in accordance with the existing watermark extraction record.

According to another embodiment, the content screening comprises at least one of: muting at least a portion of the content, blanking at least a portion of the content, displaying a copyright notice, denying access to the content, deleting the content, recording content usage information in the content handling device, sending content usage information to a remote server, playback or display of at least an advertisement stored locally or transmitted from a remote server, playback or display of a reduced resolution of the content, contacting a remote server for permission to access the content, and/or fulfilling a payment transaction with a remote server. In yet another embodiment, the content handling device is digital living network alliance (DLNA) compliant device.

In one embodiment, the operation that requires access to the content requires real-time access to the content. In this embodiment, the existing watermark extraction record comprises a segmented authentication information corresponding to a plurality of content segments, and the authentication is carried out for at least a segment of the content in accordance with the segmented authentication information. In such a scenario, the existing extraction information can accompany a streaming content. In one example, the segmented authentication information comprises a segmented hash value. In another example, the authentication is carried out for sequential segments of the content, while in a different example, the authentication is carried out for non-sequential segments of the content.

In one embodiment, the content screening is effected by evaluating the information contained within the existing watermark extraction record in conjunction with content use information associated with a predetermined time period. For example, the content use information can comprise an extracted watermark payload and an associated time stamp within a time interval immediately preceding the time when the operation is detected.

According to another embodiment, the operation that requires content access in the content handling device requires access to a plurality of contents, where one or more of the plurality of the contents have a size below a particular threshold. In this scenario, the content screening is effected by first concatenating the plurality of the contents with a size below the particular threshold and conducting a new watermark extraction operation on the concatenated content. The content screening is further effected by aggregating the results associated with the new watermark extraction operation and the information obtained from the existing watermark extraction record that correspond to one or more of the plurality of the contents with a size above or equal to the particular threshold. These operations are followed by producing an enforcement action in accordance the aggregated results.

Another aspect of the disclosed embodiments relates to a device that comprises a processor and a memory that includes processor executable code. The processor executable code when executed by the processor configures the device to retrieve an existing watermark extraction record associated with a content in response to detection of an operation in a content handling device, where the operation requires access to a content. The processor executable code when executed by the processor also configures the device to authenticate the content in accordance with the existing watermark extraction record and effect content screening in accordance with a content use policy associated with the content.

Another aspect of the disclosed embodiments relates to a computer program product that is embodied on a non-transitory computer readable medium. The computer program code comprises computer code for retrieving an existing watermark extraction record associated with a content in response to detection of an operation in a content handling device, where the operation requires access to a content. The computer program product further comprises computer code for authenticating the content in accordance with the existing watermark extraction record, and computer code for effecting content screening in accordance with a content use policy associated with the content.

Another aspect of the disclosed embodiments relates to a device that comprises means for retrieving an existing watermark extraction record associated with a content in response to detection of an operation in a content handling device, where the operation requires access to a content. The device also includes means for authenticating the content in accordance with the existing watermark extraction record and means for effecting content screening in accordance with a content use policy associated with the content.

These and other advantages and features of disclosed embodiments, together with the organization and manner of operation thereof, will become apparent from the following detailed description when taken in conjunction with the accompanying drawings.

BRIEF DESCRIPTION OF THE DRAWINGS

The disclosed embodiments are described by referring to the attached drawings, in which.

DETAILED DESCRIPTION OF CERTAIN EMBODIMENTS

Figure 1:
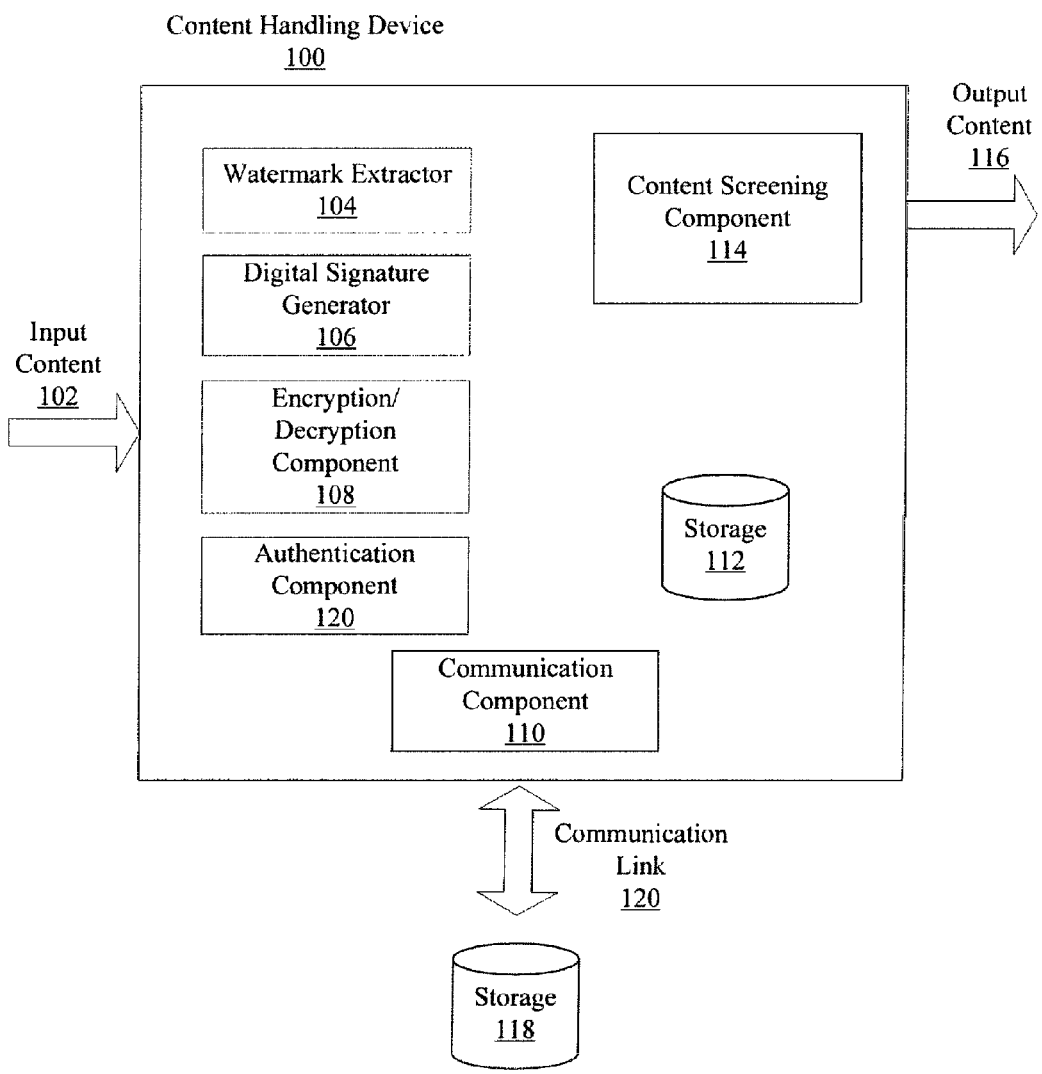
FIG. 1 is a block diagram of a content handling device in accordance with an example embodiment.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Some of the disclosed embodiments are described in the context of a Digital Living Network Alliance (DLNA) compliant network. DLNA is a cross-industry organization of leading consumer electronics, computing industry and mobile device companies. DLNA's vision is a wired and wireless network of interoperable consumer electronics (CE), personal computers (PC) and mobile devices in the home and on the road, enabling a seamless environment for sharing and growing new digital media and content services. DLNA is focused on delivering interoperability guidelines based on open industry standards to complete the cross-industry digital convergence.

In order for commercial digital content to be made available for use with DLNA devices, content must be protected from unauthorized copying and use. Digital rights management (DRM) technologies are widely available and used to protect the commercial content and manage the usage rights associated with content acquired through different channels (cable, satellite, Internet, etc.) and models (VOD, DVD, rental, etc.). DRM, however, is outside of current DLNA, which leaves the option of DRM implementation to the device manufacturer. Moreover, neither a list of approved DRM technologies nor DRM interoperability has been included in the current version of DLNA.

Link Protection is the only content protection mechanism in DLNA, which is an optional implementation for a DLNA-compliant device. The primary use case for Link Protection applies to a commercial content that is stored on a media server and protected by a DRM technology. Link Protection provides that such a content can be decrypted and re-encrypted using a Link Protection technology by the media server before being sent to a client device (such as a television). The client device then decrypts the received content and renders/displays it. DLNA Link Protection thus enables view-only sharing of commercial content on all devices in, for example, a home network. However, Link Protection is not able to prevent pirated commercial content from being shared and consumed in the home network. In fact, since a decrypted copy of the content is available within the home network, DLNA-enabled content sharing can result in easier and wider sharing of pirated content.

The absence of an appropriate content protection in DLNA has been a barrier for commercial content to be made widely available in DLNA-compliant networks. The disclosed embodiments utilize watermarks that are embedded within a host content to identify unauthorized or pirated content in a network, such as DLNA-compliant networks, and to enable the communication and enactment of use policies for content across a broad range of distribution channels and devices. In some embodiments, screening and/or content screening are used to refer to operations that include, but are not limited to, examination of a content by a device to determine whether a use conforms to a content use policy. The content use policy can, for example, include one or more rules governing the use of content, including, but not limited to, the conditions under which certain uses result in the taking of a specified action. The content use policy can also contain rules that do not control "usage" per se. For example, the content use policy can contain rules that report on the use of the content to a network server, or present an advertisement to the user, or take other actions. It should be also noted that the term extraction can refer to operations that include, but are not limited to, examination of a content to determine the presence of a watermark, and possible assessment of the auxiliary data within the detected watermark. During extraction, the watermark is typically not removed from the content. However, the disclosed embodiments can also readily accommodate watermark extraction algorithms that remove the embedded watermarks during the extraction process. According to the disclosed embodiments, by way of various operations, such as the extraction of watermarks from a content, the assessment of the content use policy associated with the extracted watermarks and the application of appropriate enforcement actions, can be distributed among one or more trusted entities. In some embodiments, such enforcement actions include, but are not limited to, the elements of a content use policy that relate to an operation or a function that is performed when a specified type of use occurs. As such, not all the devices within a network are required to possess the full range of watermark extraction and content screening capabilities in order to comply with a particular content management scheme. Further, the disclosed embodiments enable a device to determine if another device is trustworthy, and to ascertain the extent of watermark extraction and/or screening capabilities of that device. It should be noted that while some of the disclosed embodiments are described in the context of DLNA and DLNA-compliant devices and networks, the disclosed embodiments are equally applicable to other protocols, standards, networked environments and devices that are associated with the production, transmission, discovery, storage, control and presentation of media content, such as movies, audio tracks, images and the like.

As noted earlier, watermarks can be used to protect audio or audio-visual content from unauthorized uses. For example, movies that are being released to theaters can be embedded with watermarks that carry a "No-Home-Use" (NHU) code, indicating that they are only to be duplicated by professional replicators and played back on professional projection equipment. In another example, content that is released on Blu-ray Disc, DVD, or by authorized download services, can be embedded with watermarks that carry a "Trusted Source" (TS) code, indicating that such content is intended for consumer use, but with limitations that they must be protected by trusted DRM technologies. In another example, content can be embedded with watermarks carrying codes that uniquely identify the content, such as with an industry standard identification code such as the International Standard Audiovisual Number (ISAN), International Standard Recording Code (ISRC), Global Release Identifier (GRID), International Standard Book Number (ISBN), Universal Product Code (UPC), or a value assigned from another numbering system, and for which a mechanism is provided to use the identification code to "look up" more detailed descriptive information about the content and the permissions (or "rights") associated with its use, such as in a locally stored or online database. The embedded watermarks that are provided in accordance with the disclosed embodiments can be embedded within the audio, video and/or image portions of the content and are designed to remain with the content, wherever it appears, including after copying, conversion to different formats, capturing by a camcorder, and other intentional and unintentional content manipulations. Content handling devices, such as Blu-ray Disc players, can detect the presence of the embedded watermarks and limit the use of the content when certain unauthorized uses are identified. For example, playback or copying of unauthorized copies of the content may be stopped or an audio portion of the content may be muted, depending on which embedded code is extracted and what operation is being performed by the content handling device.

In some embodiments, significant improvements in watermark extraction efficiency are achieved by executing watermark extraction prior to the use (e.g., playback, copying, transmission, display, etc.) of the content. In such embodiments, the watermark extraction operation is sometimes referred to as "background" watermark extraction. A watermark extraction operation that is conducted prior to the usage of a content can produce an extraction record for secure storage in order to reduce the need for real-time extraction on the same content at the time of a future use. In some embodiments, a real-time extraction is performed on content at the time that content is being used. In some instances, watermark extraction can also be real-time extraction. As a result of watermark extraction (e.g., background watermark extraction) an extraction record can be created that includes, but is not limited to, information representing the results of a background extraction operation in a form suitable for storage. Furthermore, it is understood that the term "background" in the context of the disclosed embodiments is not intended to convey that the associated operations are necessarily performed through background processing within a multitasking operating system. Rather, background extraction can be performed as part of foreground processing, background processing, or combinations thereof. In some embodiments, the content use may be delayed until the watermark extraction process is at least partially completed. In yet other embodiments, watermark extraction and content usage are interleaved in time so that watermark extraction is always ahead of content use. In still other embodiments, watermark extraction may take place in real-time, during, and in synchronization with, the transfer or the usage of the content.

According to the disclosed embodiments, the results of watermark extraction are stored in a secure fashion so that they can be retrieved at a different time, such as at the start of content usage. In this context, the watermark extraction is carried out by a watermark extractor that can be configured to extract, process, decode and analyze the embedded watermarks to discern the presence of watermarks and/or to obtain the payload value of the embedded watermarks. In some embodiments, the watermark extraction may further include discerning some or all of the content use policy associated with the embedded watermarks. The extraction of watermarks is typically a passive operation that does not affect the integrity of the host content. A watermark extractor, which may be implemented in software, hardware and/or firmware, can be further configured to designate potential enforcement actions that must be initiated based on the extracted watermarks and in conformance with the associated content use policy. In one example, where an unauthorized usage of the content is detected through the assessment of embedded watermarks, the content may be purged (i.e., deleted). Alternatively, the content may be preserved and the user may be informed of the content status at a convenient moment (e.g. at the start of a playback attempt). In other embodiments, the user may be advised as to one or more recommended corrective actions, such as purchasing a license that allows authorized playback of the content. The above scenarios only provide a few exemplary actions that may be commenced upon the extraction of one or more embedded watermarks. However, it is understood that additional actions may additionally or alternatively be effected. Furthermore, the content use policies associated with the embedded watermarks may include automatic monitoring, logging and/or reporting the use of the particular content, associating the content with additional information (which may be accessed over the Internet), and associating the content user with other users of this or similar contents. It is understood that other actions may additionally, or alternatively, be effected.

In some embodiments, if the content has no embedded watermarks, information indicating the absence of an embedded watermark is stored (e.g., in an associated meta data file) for further use. For example, at the moment of actual content usage, the stored information, indicative of the absence of watermarks, can be used to allow content usage without a need to undertake watermark extraction. In some embodiments, the extraction process may produce watermarks that are insufficient to trigger an enforcement action. For instance, enforcement rules associated with a trusted source (TS) watermark require the extraction of watermarks over an extended period of time before triggering an enforcement action. For example, an enforcement action logic for a feature movie may require finding the TS watermarks in at least 7 out of 9 sequential 200-second screening intervals in order to trigger an enforcement action. On the other hand, for a short audio-visual content (e.g., shorter than one hour such as a TV show), an enforcement logic may require finding the TS watermarks in at least 7 out of 9 sequential 100-second screening intervals in order to trigger an enforcement action. In some embodiments, such an enforcement logic includes, but is not limited to, the elements of a content use policy that relate to the types of use of content that will result in a specified enforcement action. To facilitate the operations of a content handling device in these and other similar scenarios, upon the extraction of watermarks during the watermark extraction, a list of extracted watermarks with associated time stamps are stored for later use.

The stored information must be secured against manipulation in a secure way. In one example, digital signatures are used to ensure that the stored information is authentic and free of tampering. It is also desirable to ensure user privacy by preventing unauthorized third parties from accessing the stored information. This can be achieved by utilizing encryption techniques to protect the stored data from unauthorized access. In particular, in DLNA, digital transmission content protection over Internet protocol (DTCP-IP) is the mandatory technology when a device implements Link Protection. As such, all DTCP-IP compliant devices are assigned a unique device identification code and a device public/private key pair. In this scenario, the stored extraction information can be digitally signed by the private key of the DLNA-compliant device and encrypted using the public key of that device. In some embodiments, extraction information can include, but is not limited to, information that is obtained from performing an extraction operation. As a result, only that device can create new digital signatures and decrypt the stored extraction information, while anyone with the associated public key can detect tampering attempts to the stored information.

FIG. 1 illustrates an exemplary content handling device 100 that may be used to accommodate the disclosed embodiments. The content handling device may conduct one or more operations such as rendering, recording, copying, transferring and/or playback of an input content 102. The input content 102 may be communicated to the content handling device 100 through one or more communication channels comprising wired and/or wireless communication channels, magnetic, optical, Flash and/or other computer readable media, or other sources. As such, the content handling device 100 can be configured to detect the presence of the input content 102. The same or a different component within the content handling device can detect a request for the input content 102 that is received from another entity. The detection of the input content 102 or the reception of a request for the input content 102 can be carried out by a detector/receiver component within the content handling device 100. Such a detector/receiver component can be part of, or a separate component from, the commutation component 110. In embodiments where the content handling device 100 is configured to request a content from another entity, a component, such as a processor that is executing a program code, within the content handling device 100 can generate such a request for the content and transmit the request to another device through, for example, the communication component 110. In one example, the content handling device 100 is DLNA-compliant device, which may be in communication with one or more other DLNA-compliant devices. The content handling device comprises a watermark extractor 104 that screens the input content for the presence of watermarks. As noted earlier, the watermark extractor 104 can extract, process, decode and/or analyze the embedded watermarks and to discern the content use policy associated with the embedded content. The content handling device can also include a digital signature generator 106, which can be configured to produce digital signatures in accordance with one or more algorithms.

Further, an encryption/decryption component 108 within the content handling device 100 can be configured to encrypt/decrypt some or all of the input content 102 and/or extraction information that is produced by the watermark extractor 104. The encryption/decryption component 108 can be configured to implement a variety of public- and/or private-key encryption and/or decryption algorithms. The content handling device 100 can further include an authentication component 120 that can produce authentication parameters associated with the input content 102, authentication information associated with extraction information, and/or device authentication information (e.g., certificates). For example, the authentication component 120 can include a hash generation component that generates hash values for a sequence of input values. The authentication component 120 can further compare newly generated authentication information with a previously stored authentication information to verify an integrity of a content. The authentication component 120 can be configured to implement a variety of hashing algorithms, such as MD5. SHA-1 and SHA-2. The authentication component 120 may further be configured to carry out the necessary operations to effect device authentication. As such, the authentication component 120 can generate and communicate requests for device authentication, authentication information, exchange authentication certificates and verify the trustworthiness of another device.

FIG. 1 also illustrates one or more storage units 112 that can reside within the content handling device 100. Such storage units 112 can store the input content 102 (e.g., in encrypted, partially encrypted or clear format), the information produced by the watermark extractor 104 and the associated indexing information and meta data, content authentication information, compliance rules associated with the usage of embedded content and the associated enforcement actions, as well as computer program code that can be retrieved in order to implement any one of the functionalities of the disclosed embodiments. As such, the storage unit 112 can be in communication with various components of the content handling device 100, such as the watermark extractor 104, the digital signature generator 106, the encryption component 108, the authentication component 120, one or more processors within the content handling device 100 and the like. These components can retrieve and utilize the information, the computer codes and the content that are stored on the storage units 112. FIG. 1 also shows a storage unit 118 that may reside outside of the content handling device 100. The outside storage unit 118, which may be in communication with the content handling device 100 through the communication component 110 via the communication link 120, can store some or all of the above noted input content 102, watermark extraction records, as well as other data and program code. The communication component 110 may further allow the content handling device 100, or particular modules or components with the content handling device 100, to communicate with the outside storage unit 188 and/or outside entities and users.

FIG. 1 also depicts a compliance enforcer 114 that can be configured to evaluate the enforcement logic associated with the extracted watermarks of a particular content, and enforce the rules associated with enforcement actions. For example, such enforcement actions can include aborting the desired operation (e.g., not outputting the output content 116), muting the audio and/or blanking the screen associated with the output content 116, and/or presenting a copyright restriction notice. It should be understood that the content handling device 100 can also include additional components, one or more processors or controllers and additional memory devices that are not explicitly shown in FIG. 1. For example, a component within the content handling device may receive information associated with other devices that can communicate with the content handling device 100. Such information can be received, for example, through the communication component 110. The same, or a separate, component within the content handling device 100 can make decisions regarding the delegation of some or all of the screening operations (such as watermark extraction, screening, etc.) to the components within the content handling device 100 (e.g., to watermark extractor 104, compliance enforcer 114, etc.) and/or to other devices that can communicate with the content handling device 100. The components within the content handling device 100 can be implemented in hardware or software, or combinations thereof. In addition, while the media handling device 100 of FIG. 1 is depicted as a single device, one or more of the components or modules associated with the content handling device 100 may be implemented as part of a separate device. For example, the watermark extractor 104 may be implemented in a first device that is separate from a second device that implements the compliance enforcer 114.

The watermark extraction that is carried out in accordance with the disclosed embodiments can be executed whenever a new content is detected (e.g., within a home network, such as a DLNA-compliant network) and whenever spare resources are available to certain trusted device within the DLNA-compliant network. This way, peak processing loads on any given device can be decreased by distributing the processing load over time and/or over other devices with the home network. The disclosed embodiments further enable background watermark extraction to be carried out in conjunction with other trusted devices that may reside outside of the home network and/or trusted devices that are part of a different network. For example, the background processing operations may be conducted, at least in-part, by trusted devices that reside within a DLNA-compliant network that can, directly or indirectly, communicate with devices that may reside in a non-centralized network of devices in a secure fashion. Further details as to how trusted devices are identified and utilized to carry out all, or part of, the content screening operations will be discussed in the sections that follow. In some examples, the background watermark extraction is executed with a low priority to ensure the availability of computational and memory resources for other higher-priority operations and to improve user's experience.

To facilitate access and retrieval of the extraction information, extraction records can be indexed by the content file name (which, for example, includes the file folder name or the path to the file), by a universal resource locator (URL) associated with the watermark extraction records. The extraction records can also contain the file size of the associated content. Presence of a new content can be detected by periodically searching for new file names on the device or additional/affiliated devices that may reside within the home network. Alternatively, or additionally, the presence of a new content can be detected whenever the opportunity for watermark extraction arises, such as in situations where spare computational and memory resources become available.

Figure 2:
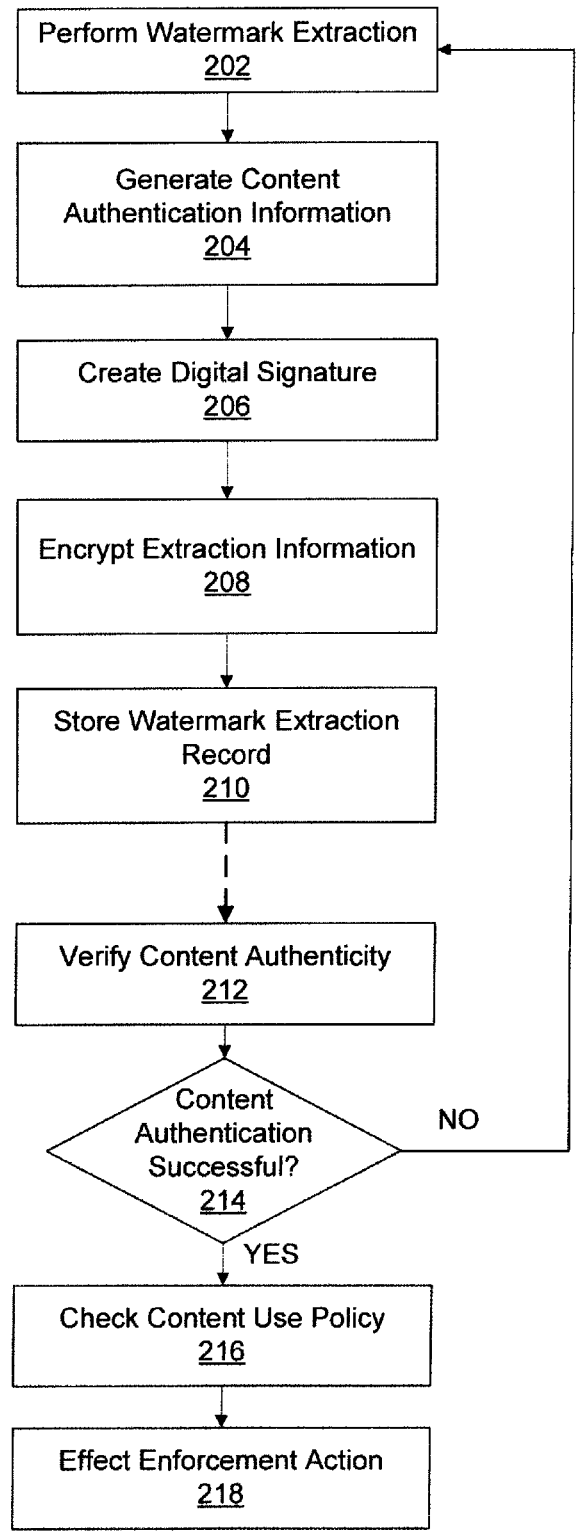
FIG. 2 is a flow diagram of certain watermark extraction and content screening operations in accordance with an example embodiment.

FIG. 2 illustrates the operations associated with the generation of extraction information and the usage of such information in accordance with an exemplary embodiment. The process starts at 202, where watermark extraction is performed. The results of the watermark extraction can include the payload value of extracted watermarks and an associated time stamp that designates the temporal location of the extracted watermark within the content. The extraction information can further include a file name, a file size and other information associated with the content. At 204, content authentication information is generated. This information can be used to verify that the content has not been modified or tampered with. For example, at 204, a hash value associated with the content can be generated. As will be described in the sections that follow, hash value generation can ensure authenticity of the content and its proper correspondence to the associated extraction information. At 206, a digital signature associated with the extraction information is calculated. In one example, the digital signature is appended to the extraction information. At 208, at least a portion of the extraction information and the associated digital signature are encrypted. In one example, only the extraction information is encrypted, while in another example, both the extraction information and the associated digital signature are encrypted. The fully, or partially, encrypted extraction record is then stored on a storage media at 210. Certain additional operations, such as indexing of the content items, compressing the content items, etc., may also be carried out at some point after watermark extraction 202 but before storage of extraction information 208.

Referring to FIG. 2, the stored extraction information may be retrieved at a later instance in time (e.g., at the time of playback of the content). At 212, authenticity of the content is verified. Authentication of the content will be described in further details in the sections that follow. If content authentication does not succeed ("NO" at 214), watermark extraction operations are conducted for the content by, for example, returning to block 202. If content authentication succeeds ("YES" at 214), the content use policy associated with the extraction information is checked at 216. For example, the content use policy associated with a No Home Use watermark payload can prevent the playback of the content on a consumer device. The content use policy may be stored at a storage location internal or external to the content handling device. Additionally, or alternatively, the content use policy may be received from an outside entity, such as a trusted authority. At 218, the applicable enforcement actions (if any) are effected. For example, an audio portion of the output content can be muted, or a copying operation can be aborted. Other examples of actions that may be effected in conformance with the content use policy include, but are not limited to, displaying a copyright notice, denying access to the content, deleting the content, recording content usage information in the content handling device, sending content usage information to a remote server, playback or display of at least an advertisement stored locally or transmitted from a remote server, playback or display of a reduced resolution of the content, contacting a remote server for permission to access the content, and/or fulfilling a payment transaction with a remote server. It should be noted that, in some embodiments, the content use policy associated with the extracted watermarks is stored along with the extraction information in step 210. In these embodiments, prior to the application of the enforcement action at 218, it must be ensured that the stored content use policy is up to date. In another embodiment, the applicable enforcement actions may also be stored along with the extraction information at 210.

The operations that are illustrated in the block diagram of FIG. 2 are also applicable to the embodiments where the extraction of watermarks are carried out in real-time (e.g., as the content is being rendered, displayed, etc.). In such embodiments, the extraction information, at 202, is produced in parallel with, or slightly earlier than, rendering a particular segment of the content. The extraction information, which is stored, at least temporarily, at a storage location, can be accessed to determine if an enforcement action is needed in conformance with the associated content use policy. In real-time applications, the creation of a digital signature, at 206, and encryption of the extraction information, at 208, may not be feasible due to a lack of computational resources. In these scenarios, the extraction information may be stored within a tamper-resistant portion of the watermark extractor. Implementation of tamper-resistant modules within a device (i.e., a software and/or a hardware device) can be carried out in accordance with tamper-resistant techniques and algorithms that are known in the art.

Figure 3:
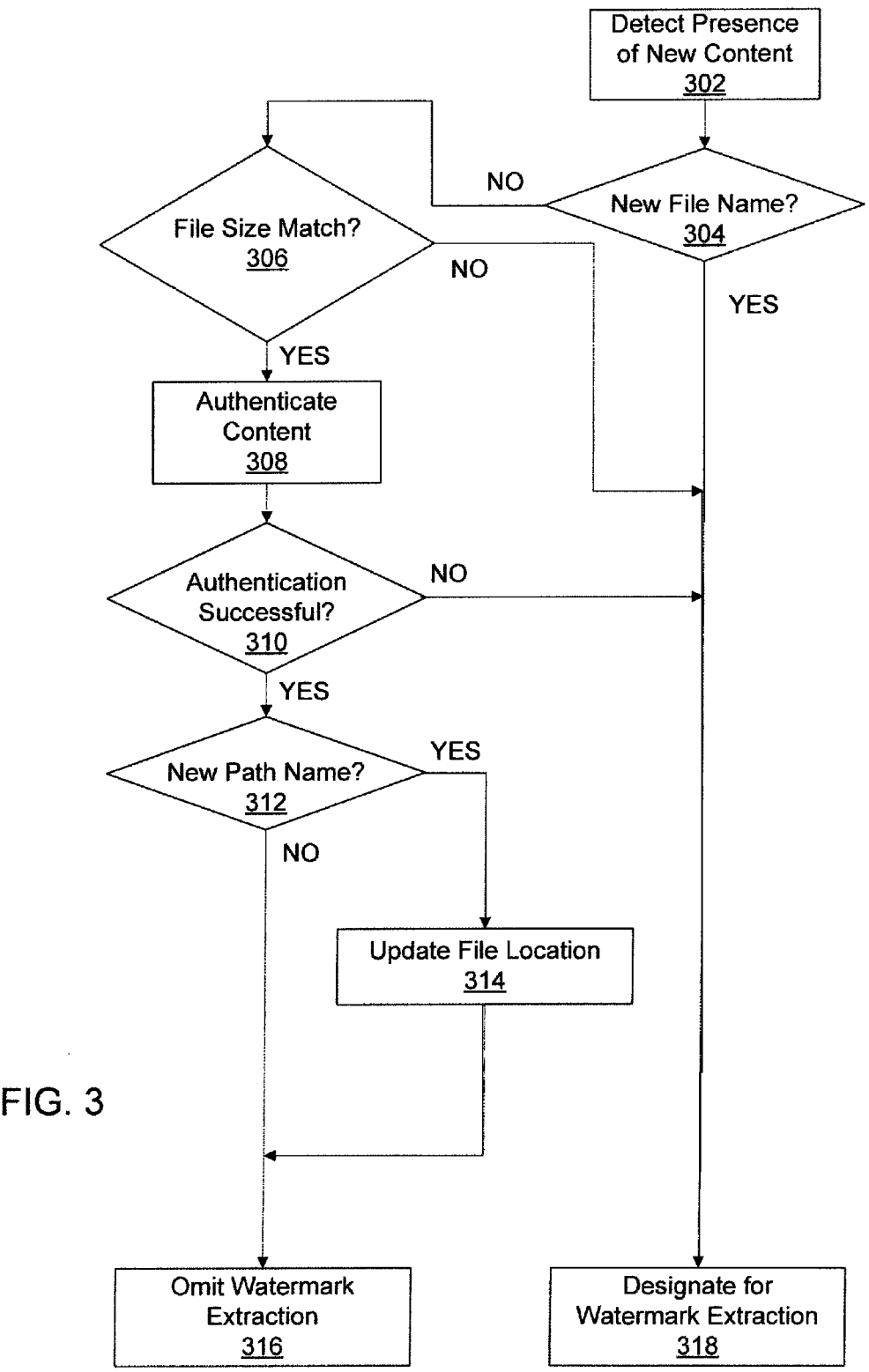
FIG. 3 is a flow diagram of certain watermark extraction operations in accordance with an example embodiment.

FIG. 3 illustrates the operations that are commenced upon the detection of a new content file at a content handling device. In some embodiments, a new content is detected when a device encounters a new content and commences the subsequent actions for obtaining the associated extraction records. In such scenarios, a "new content" is any content that does not have a matching file and/or path names in the extraction records. In other embodiments, a content handling device may monitor certain operations, such as "save" and "import" operations, and trigger additional operations if particular conditions are satisfied. In these embodiments, a content that has a matching path and file name is still considered a new content. Referring back to FIG. 3, at 302, the presence of a new content is detected. If, at 304, it is detected that the file name is new (i.e., a content file name match cannot be found in the extraction records), the file is designated to be subject to watermark extraction at 318. For example, the content can be placed on a waiting list to be processed for watermark extraction. In one embodiment, a content file is considered a new file if the file's base name (regardless of the file's full path name) does not exist within the device or an associated entity, such as a connected database. If the content file is not new (i.e. "NO" at 304), it is determined, at 306, if the new content and the existing content have an identical file size. If the file sizes do not match (i.e., "NO" at 306), the process moves to 318, where the content is designated for watermark extraction. If, at 306, the file sizes do match (i.e., "YES" at 306), a content authentication operation is triggered at 308 (content authentication procedures will be described in the sections that follow). If content authentication fails (i.e., "NO" at 310), the content is designated for watermark extraction at 318. Otherwise (i.e., "YES" at 310), it is determined, at 312, if the content path name is new (i.e., via comparing the path name of the new content against the existing path name that is saved in the extraction record). If the path names are identical (i.e., "NO" at 312), watermark extraction is omitted at 316. Otherwise, if the path names are different (i.e., "YES" at 312), the extraction record is updated with the new file location at 314 and watermark extraction is omitted at 316.

The flow diagram of FIG. 3 is intended to facilitate the understanding of the disclosed embodiments. Therefore, additional or fewer steps may be undertaken in order to implement the various embodiments. It should be also noted that in order to facilitate the search for new and/or duplicate files, the stored content files and/or the associated extraction records may be indexed using a variety of indexing techniques and parameters. For instance, the file name may be used as an index for searching a database of content files.

In other embodiments, the device further verifies if the previously analyzed files (e.g., files that have previously been subjected to watermark extraction) are still present on the device. This process can be executed in association with the process of searching for new files, or it can be performed independently when spare resources are available, or when a delete action is executed on the device. If the content associated with an extraction record is removed from the device, the extraction record may also be removed to conserve memory resources and to reduce the computational efforts in searching through stored extraction records.

In some embodiments, where extraction information is not available at the time of content use, watermark extraction can be executed at real-time (i.e. on-the-fly). If enough computational and/or memory resources are not available for both the execution of a real-time extraction and usage of the content, the content use can be delayed until the watermark extraction process is at least partially completed. In some examples, watermark extraction and content usage are interleaved in time (e.g., watermark extraction over one segment is followed by usage of that segment) so that watermark extraction is always ahead of content use.

An important security consideration is the possibility of content modifications or substitutions after the watermark extraction has been completed. For example, an unmarked content may be initially imported, and then an external program may attempt to replace watermark-bearing component of the content with a new content (which may have embedded watermarks). In this process, an attacker may intentionally preserve the same file name and file size to prevent the content from being designated for watermark extraction. To foil this attempt, the device must authenticate the content before using the stored extraction information. This operation was previously described in connection with step 212 in FIG. 2.

Content authentication can be quickly and securely carried out using one-way cryptographic hash function such as MD5, SHA-1 or SHA-2. During the watermark extraction process on a newly imported file, a hash value is calculated and saved together with the extraction results, as depicted in FIG. 2, steps 204 to 210. When content usage is commenced, a hash value for the content is computed and compared to the previously stored hash value (e.g. at 212 in FIG. 2). If the newly computed values match the stored hash values, the content is deemed to be authentic and, therefore, the associated extraction information can be used to effect any applicable enforcement actions. Otherwise, if the calculated and stored hash values do no match, the usage of the content may be fully or partially disabled (e.g., copying aborted, playback stopped, copyright notice displayed, etc.). Additionally, or alternatively, the content can be designated to undergo a new watermark extraction operation (see, e.g., FIG. 2, "NO" at step 214 and FIG. 3, "NO" at step 310).

In some embodiments, the content authentication information (e.g., a hash value) is produced (e.g. at step 204 in FIG. 2) when the content is in encrypted format. This way, when content authentication is conducted (e.g., at step 212 in FIG. 2), there is no need to decrypt the content before verifying the content's authenticity. Therefore, at the moment of content use, the disclosed embodiments only require the generation of the content authentication information (e.g., a hash value) rather than undertaking a full watermark extraction operation. This aspect of the disclosed embodiments provides a substantial improvement in efficiency of operations of a content handling device, especially in cases where content transformations, such as decryption, decompression, de-multiplexing etc., are required prior to watermark extraction. Many hash functions can be implemented efficiently in hardware and/or software. In some instances, where the watermark extraction records are encrypted (see, e.g., FIG. 2, step 208), the stored extraction information must be decrypted in order to retrieve the stored hash values. However, since the size of the stored watermark extraction record is relatively small, such a decryption operation is not likely to present a significant processing burden.

A critical requirement in selecting a hash function is the pre-image resistance, defined as follows: given a hash value h, it should be hard (almost certainly beyond the reach of any adversary) to find a message m such that h=hash(m). This requirement is related to an attack where a pirate tries to substitute a marked content with an unmarked content, which has the same hash value, in order to create an extraction-free watermark extraction report. In this attack scenario, after the content handling device conducts a watermark extraction on an unmarked content, the attacker may attempt to replace the unmarked content with a marked content with the same hash value to avoid the screening of marked content.

It should be noted that the above noted pre-image requirement is easier to satisfy than a collision resistance requirement. The collision resistance requirement can be defined as follows: it should be hard to find two different messages m1 and m2 such that hash(m1)=hash(m2). This requirement, which is more common if hash functions are used for indexing schemes, typically necessitates the use of more demanding hash functions, such as the SHA-2 family of hash functions. However, in scenarios where the less stringent pre-image resistance provides the sufficient protection, simpler and less computationally demanding hash functions, such as MD5 and SHA-1 may be used.

In some embodiment, further reductions in processing load associated with hash function calculation can be achieved by selecting only a subset of data from the content to be input to hash function calculation. In one example, the selection process is maintained as a secret. For instance, random content segments can be selected using a random number generator that uses the device private key as a seed.

The disclosed embodiments further provide for the operation of a content handling device by considering security concerns related to mosaic attacks. A mosaic attack is defined as breaking up a content into multiple segments such that each content segment can individually evade an enforcement action. In this attack scenario, a content is divided into segments that are individually subject to watermark extraction. During the actual content use, the segments are assembled again for presentation to the user using, for example, a playlist feature at content rendering instance. A coarse mosaic attack typically involves producing relatively large content segments. For example, a feature movie may be segmented into several 10-minute chunks in order to avoid Trusted Source (TS) enforcement on individual segments. This attack can be successful for a TS-marked content since, as noted earlier, repeated watermark extractions in several content segments are required to trigger an enforcement action.

In one embodiment, a coarse mosaic attack can be circumvented in a compliant device by safely storing the content use history associated with that device, and subsequently retrieving and analyzing the content use history with each new content use. The content use history provides a record of all watermark extractions, together with an associated time stamp, within a predefined interval (e.g., for at least the last 20 minutes content use by the device). Watermark extraction results for any new content use can then be appended to the retrieved content use history data in order to evaluate if an enforcement condition is present. In the case of a mosaic attack that utilizes a playlist, the evaluation of an enforcement condition can be based on an aggregate of a retrieved content use history and the extraction record for each item on the playlist in the listed order. This way, the enforcement condition can be efficiently evaluated without having to conduct a real-time watermark extraction operation content use commences.

Another attack scenario relates to a fine mosaic attack, in which a content is divided into a large number of segments with fine granularity such that watermark extraction from each individual segment is not feasible. A fine mosaic attack implies a significant overhead due to small file handling and, therefore, may not be practical for many devices. For example, a feature movie may be segmented into one-second clips and saved as a string of independent files that are later concatenated using some kind of playlist function. Nonetheless, in accordance with the disclosed embodiments, fine mosaic attacks can be effectively thwarted by properly recognizing the presence of such an attack. In one embodiment, the existence of content files below a certain size limit triggers a fine mosaic countermeasure. For example, the detection of audio-visual content files that are less than five seconds long may be a flag that triggers fine mosaic countermeasures during a watermark extraction process.

In one embodiment, a fine mosaic attack is thwarted by requiring watermark extraction over a number of concatenated files provided in a playlist. Watermark extraction over the concatenated files can be carried out prior to the content use, or in real-time, during the content use. In one embodiment, if the concatenated file contains a mix of files below and above the size limit, watermark extraction is performed only for the set of adjacent short files with a total length above the size limit. The result of this extraction process can be combined with the results of extraction information for the files above the size limit (which should have been previously conducted), and used for enforcement logic evaluation and/or enforcement.

In an alternative embodiment, an advanced watermark extractor may be instantiated upon the detection of a fine mosaic attack. The advanced extractor can perform the bulk of the processing in the background mode, and save intermediate data for future use. For example, the intermediate data can consist of content features that are relevant for watermark extraction and have a size that can be much smaller than the original content. This feature of the disclosed embodiments can result in a significant reduction in the usage of computational and memory resources. Therefore, upon the detection of a fine mosaic attack, the device can quickly and efficiently extract the embedded watermarks just by evaluating the intermediate data as opposed to attempting to extract the watermarks from the original content. For example, in a system that uses spread spectrum watermarking, the intermediate data can comprise correlation values between a known spread spectrum carrier and the content samples with a particular granularity. At the moment of content use, the intermediate data is concatenated, watermark extraction is attempted and enforcement condition is evaluated based on any watermarks extracted from the intermediate data. As noted earlier, in some embodiments, if the concatenated file contains a mix of files that are below and above the size limit, the intermediate data concatenation and watermark extraction are needed only for the set of adjacent short files with total length above the size limit. The result of this extraction process can be combined with the extraction information associated with the files above the size limit, and used for enforcement logic evaluation and/or enforcement.

In scenarios where a network of trusted devices can be established, it may be advantageous to use the network to share the watermark extraction and enforcement responsibilities. In one embodiment, if a device with a new content item is not able to interpret the content's format, the device may entrust all, or a portion of, the watermark extraction operations to another device that can interpret the content format. The device that performs the watermark extraction may report the extraction information to the delegating device for further action and/or secure storage.

Figure 4:
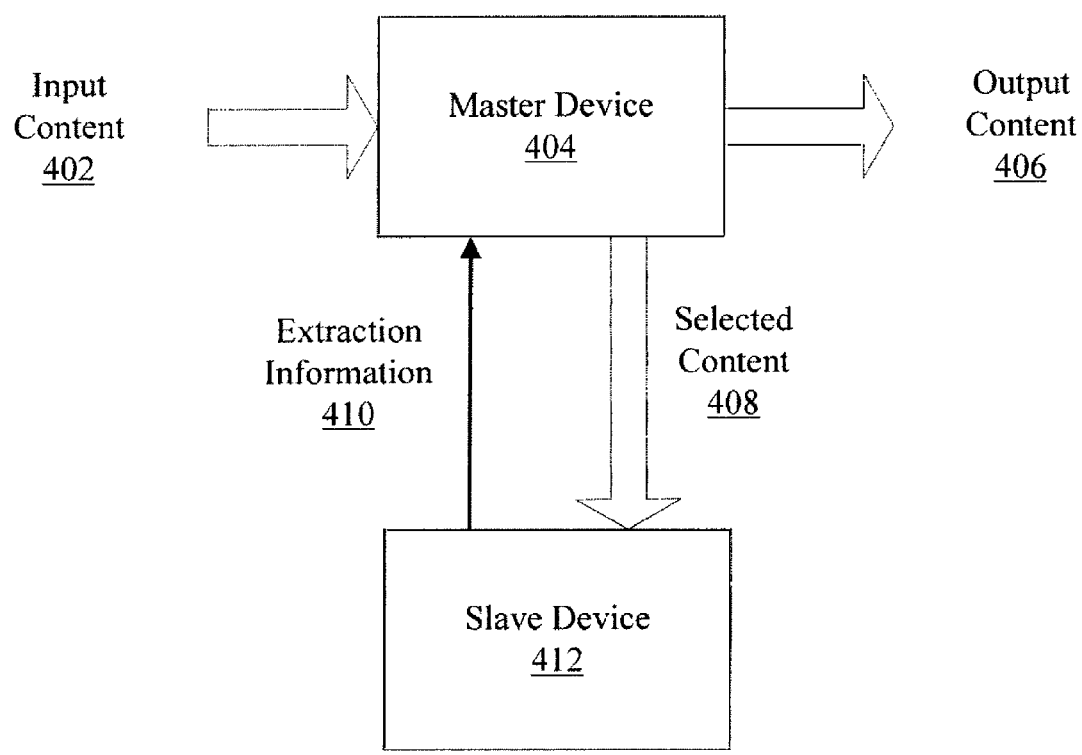
FIG. 4 illustrates a block diagram of a invocation model device configuration in accordance with an example embodiment.

FIG. 4 illustrates an exemplary embodiment in which an invocation model is used to enable cooperative watermark extraction. In this embodiment, a master device 404, which receives an input content 402, is tasked with performing an operation (e.g., copying, transferring, playing, recording, etc.) that produces an output content 406. As depicted in FIG. 4, the master device 404 invokes a slave device 412 to perform watermark extraction on a selected content 408 that is communicated to the slave device 412. Upon full or partial completion of watermark extraction by the slave device 412, the master device 404 receives the extraction information 410 and decides if the selected content 408 will be delivered to the destination device and/or if additional enforcement actions, such as muting or displaying a warning message, are warranted. This invocation model can be applied in situations where the master device 404 doesn't have the capability of watermark extraction or it is overloaded (e.g. in case of multiple instances of streaming or watermark extraction tasks) or it does not have appropriate codecs to handle the selected content.

Figure 5:
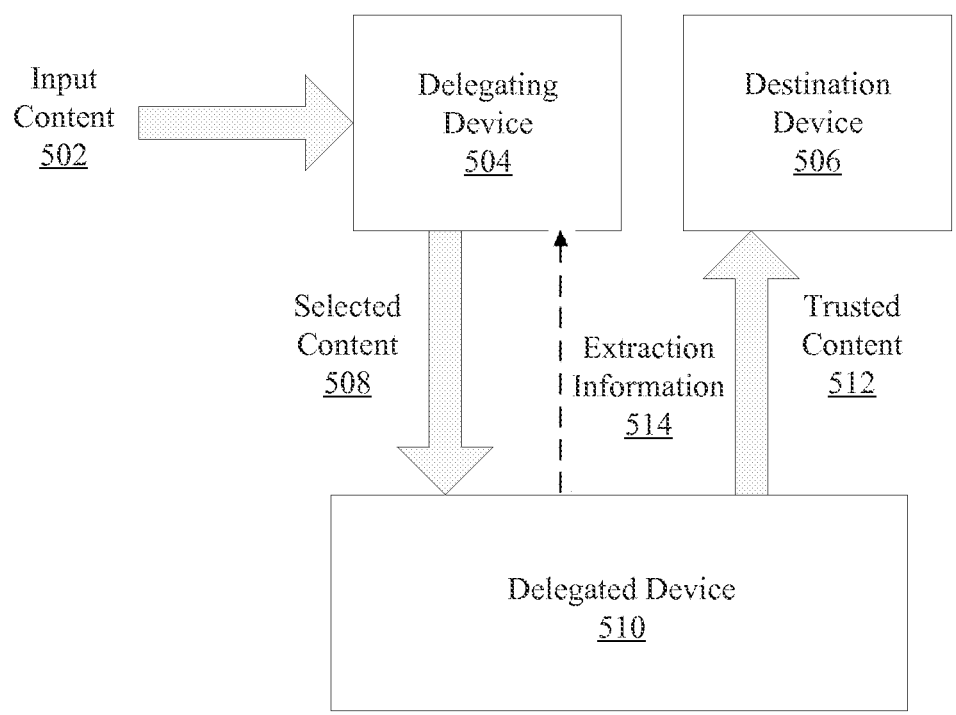
FIG. 5 illustrates a block diagram of a delegation model device configuration in accordance with an example embodiment.

FIG. 5 illustrates another exemplary embodiment in which a delegation model is used to enable cooperative watermark extraction. In this embodiment, a delegating device 504, which is tasked with performing an operation on an input content 402 (e.g. copying, transferring, playing, recording, etc.), completely delegates the watermark extraction to a delegated device 510. The delegated device 510 receives the selected content 508 from the delegating device 504 and performs the watermark extraction operations. The delegated device 510 further decides whether or not to forward the requested content (i.e., the trusted content 512 if the decision is made to forward the content) to a destination device 506 in accordance with the content use policy associated with the extraction information 514. In one scenario, the delegated device performs the watermark extraction and screening operations while streaming the content until the content use policy limits the use of the contents (e.g. stop of the streaming or muted audio). In another scenario, the transfer of the content to the destination may start only after the partial or full completion of the watermark extraction and screening. Further, the delegated device 510 may or may not return the extraction information 514 to the delegating device 504 (this optional operation is depicted by the dashed arrow in FIG. 5 that starts from the delegated device 510 and terminates at the delegating device 504). The delegating model can be used in various scenarios where the delegating device 504 doesn't have the capability of watermark extraction or it is overloaded (e.g. in case of multiple instances of streaming or watermark extraction tasks) or it does not have appropriate codecs to handle the requested content. In particular, this model is useful in the scenarios where the presence of a bridge device (e.g., the delegated device 510) is needed to enable a content transformation, such as converting a high-definition content to an MPEG-4 mobile version, and the like.

In both invocation and delegation models, the devices that may cooperatively perform screening may be aware of the codecs capability bilaterally or unilaterally. They may inquire or exchange the codecs capability before or at the beginning of the transfer of the selected content. For example, in DLNA that adopts HTTP protocol for content transfer, a device uses the MIME-TYPE values that are defined in DLNA Media Format Profiles as values for Content-Type in a HTTP request or response to specify the codecs of the requested content. Other content transfer protocols such as RTP (Real-time Transport Protocol) also support exchange of codecs capability.

In some systems that utilize invocation or delegation models, it may be possible that the sender of the selected content (either master device 404 or delegating device 504) is not aware of the codec capability of a receiving device (either a slave device 410 or a delegated device 510). In some embodiments, in such situations, if the receiving device does not have the appropriate codecs that are required to process the requested content, the receiving device informs the sender of the exception immediately (as part of extraction information 514). The receiving device may also optionally request the sender to convert and re-transfer the content in a media format that can be processed by the receiving device.

In real-time watermark extraction scenarios, cooperative watermark extraction in accordance with the disclosed embodiments can be implemented in situations where a first device accesses the content and a second device renders (e.g., displays) that content. In these scenarios, the content-accessing device is usually unable to interpret the content, while the rendering device (which is, of course, able to interpret the content) is not trusted. In this case, the content-accessing device may initiate a search to discover a trusted device that can interpret the content. Such a trusted device must also be able to execute watermark extractions at a rate faster than, or equal to, the real-time rendering of the content. The trusted device may, for example, be identified by consulting a list of trusted devices that can be securely accessed by the content-accessing device. Such a list can also be communicated securely to the content accessing device from a trusted authority. In another embodiment, the list is created during device discovery based on UPnP (Universal Plug and Play) networking protocols. For example, DLNA uses UPnP for discovery and description of device types and capabilities. In other embodiments, a device authentication procedure is commenced to verify the trustworthiness of a device and to ascertain its capabilities. Device authentication procedures will be further described in the sections that follow. The extraction results and/or enforcement events that are produced by the trusted device may be returned to the content accessing device for further action and/or secure storage.

The above-noted real-time watermark extraction scenario can be considered an example of the invocation model described above. This example scenario allows a commercial content to be delivered on a legacy rendering device (e.g. DLNA TV without a watermark extractor). To encourage the adoption of trusted rendering devices, incentives may be provided by the content owners, PayTV companies and Over-the-top (OTT) and on-demand content providers to the users who render the premium content directly on a trusted rendering device. Alternatively, a flag in a DRM-protected commercial content may be inserted by the content distributor to indicate that the content must be rendered by a trusted client.

In some embodiments, if a real-time watermark extraction operation is not feasible (even with the cooperation of additional trusted devices), a delayed watermark extraction operation may, nevertheless, be conducted whenever the necessary resources become available. The results that are produced by the delayed watermark extraction operation may be stored as part of the extraction record for that content. For example, the watermark extraction record may be stored at a database, where it can be accessed in the future by one or more trusted devices. In scenarios that a delayed watermark extraction operation is performed, any subsequent real-time access to that content can be readily screened using the stored extraction records.

Another aspect of real-time applications (e.g., live streaming of a video content) is that only a fraction of the content is made available before its rendering. In these cases, it may not be possible to execute watermark extraction, using only locally available resources, prior to the content use. Therefore, as noted earlier, a real-time watermark extraction operation may be needed. In some embodiment, the need for conducting a real-time watermark extraction may be eliminated by providing an extraction record that is produced by a trusted device to accompany the streaming content. As noted earlier, content authentication can ensure the integrity of the content and its proper correspondence with an existing extraction record. However, in the context of a streaming application, full authentication of the streaming content may not be possible during the streaming of the content since the full content only becomes available at the end of the streaming session.

In some embodiments, authentication of one or more portions of a content is enabled by utilizing segmented hash values. In particular, the content is divided into segments of a particular size (e.g., 10 seconds in time or 1 MB in size) and a hash value is generated for each content segment and stored together with the corresponding watermark extraction record. This way, a content may be authenticated in smaller units according to the granularity of content segments with the calculated hash values. During the streaming operation, a received content segment (e.g., that resides in a buffer) can be authenticated by calculating its corresponding hash value and comparing it to the hash value stored in the extraction record. The segments can be selected sequentially and contiguously for authentication as they become available during the streaming operation. Alternatively, a subset of content segments can be selected for authentication. In one embodiment, a subset of segments may be selected according to a deterministic pattern (e.g., every third segment is selected) or according to a random/pseudo-random selection pattern (e.g., random selection with uniform distribution). An authentication failure, for even one segment, can signal that the content has been manipulated and, therefore, trigger the real-time extraction operation. Alternatively, a detection of content manipulation can abort the content use.

According to the disclosed embodiments, a segmented hash value is composed of a sequence of hash values, where each hash value is calculated from a segment of content. The segment can be defined by a fixed time period or fixed byte size of the content. Moreover, the final content may be padded to produce a segment with the pre-defined fixed size. One exemplary algorithm for generating a segmented hash function is described as follows. Let's assume that C is an audio-visual content, and $c_1, c_2, \ldots c_n$ are consecutive segments of C, or randomly selected segments of C. In case of selection of segments, the flexibility between authentication granularity and performance can be achieved. For example, for better computation performance, fewer segments can be selected. The size of segment will also have an impact on the performance as measured by computational and resource efficiency. In particular, smaller segments require fewer computations for authenticating that particular segment. However, a minimum segment size limit may be required to ensure the security of the hash function.

In one embodiment, the security of the generated hash values can further be enhanced by providing a segment size that varies within a particular range, as determined by, for example, a random number generator. An exemplary algorithm for generating hash values associated with variable segment sizes is described as follows. Let's assume HF is a hash function that accepts a seed value, s, and a block of data, $c_n$, to produce a hash value, $h_n$. The hash values for segments $c_1, c_2, \ldots c_n$ can be calculated using the following set of operations:

$$h_1 = HF(s, c_1);$$
$$h_2 = HF(h_1, c_2);$$
$$\ldots$$
$$h_n = HF(h_{n-1}, c_n).$$
(1)

A hash value, $H_i$, for a content up to the segment $c_i$ ($1 \leq i \leq n$) can be calculated as follows.

$$H_i = HF(s, h_1 + h_2 + \ldots + h_i)$$
(2)

One major advantage of using hash values for content identification is that the hash function takes the streaming content as a binary stream, regardless of the content format, whether or not the content is encrypted and which cryptographic algorithms are used for the encryption. The disclosed embodiments can be used in conjunction with different hash functions. For example, an MD5 implementation in software on a Pentium 90 MHz computer can process the input data at 45 mega bits per second. To further speed up the hashing process, instead of every byte, some selective bytes from each segment can be taken as the input to the hash function.

In another real-time watermark extraction scenario, cooperative watermark extraction in accordance with the disclosed embodiment may be implemented in situations where a content-accessing device lacks the processing power to simultaneously carry out content access, transmission, rendering, and watermark extraction. In particular, such a scenario may arise when the same device is configured to conduct simultaneous access and transmission of multiple content streams. In these scenarios, watermark extraction can be delegated to a capable and trusted device. The extraction information and/or enforcement events may be returned to the content-accessing device for further action and/or secure storage. This real-time cooperative watermark extraction is another example of the invocation model described above.

Figure 6:
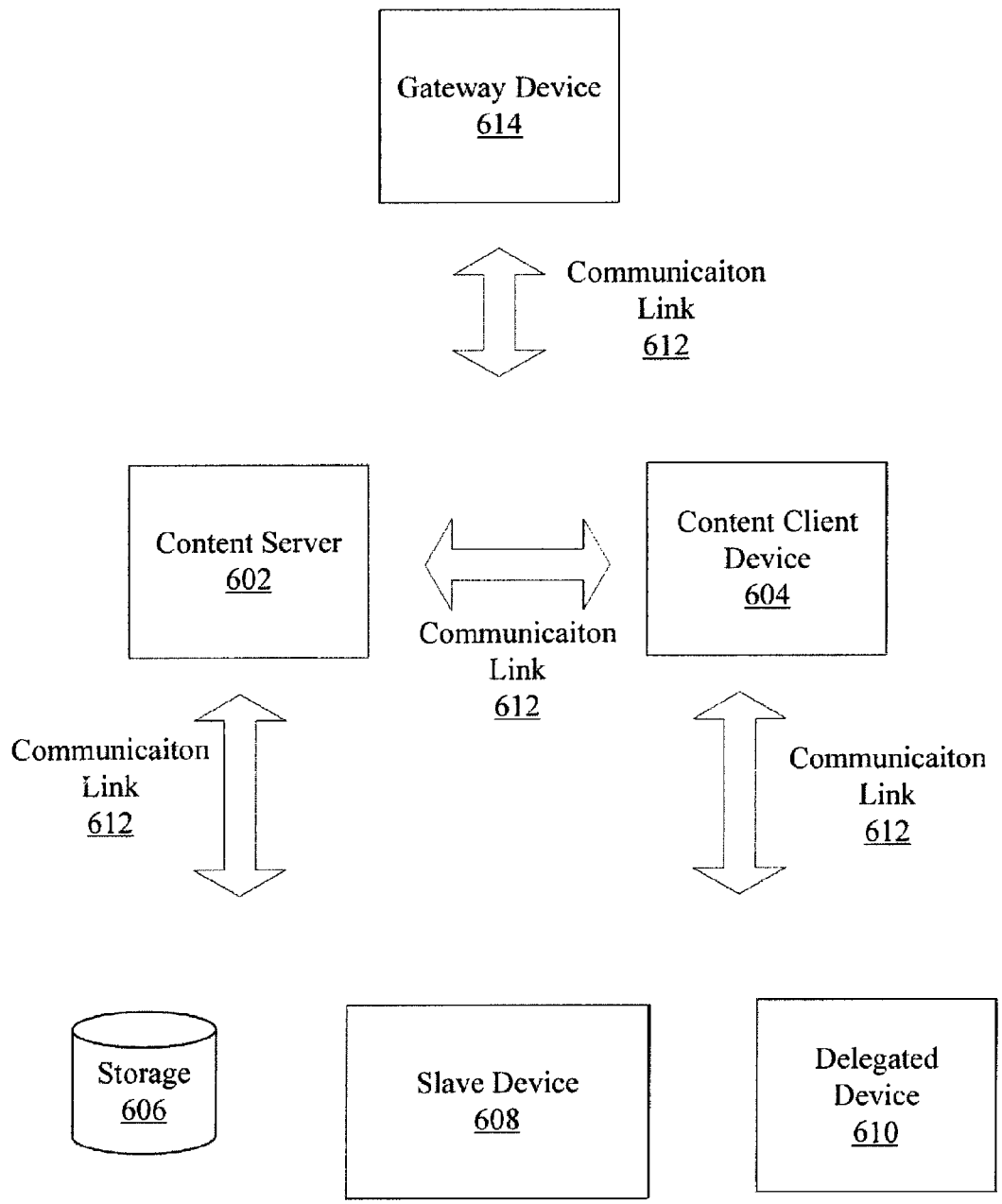
FIG. 6 illustrates a block diagram of a content server and content client device configuration in accordance with an example embodiment.

FIG. 6 illustrates another example embodiment, in which a content is delivered to a content client device 604 by a content server 602. The content server 602 and/or the content client device 604 may be in communication with a storage unit 606, a slave device 608 and/or a delegated device 610. Depending on the system configuration, the content server 602 and/or the client content device 604 may communicate as a master device with the slave device 608, as discussed earlier in connection with the invocation model of FIG. 4. Similarly, depending on the system configuration, the content server 602 and/or the client content device 604 may communicate as a delegating device with the delegated device 610, as discussed earlier in connection with the delegation model of FIG. 5. The communication links 612 that are depicted in FIG. 6 enable communications of content, extraction information and other information between the devices that are shown in FIG. 6. For example, one or more of the communication links 612 can allow secure communications (e.g., through link encryption) between the different devices. Further, one or more of the content server 602, content client device 604, storage unit 606, slave device 608 and delegated device 610 may reside within a home network, such as a DLNA. In other embodiments, one or more of the content server 602, the content client device 604, the storage unit 606, the slave device 608 and the delegated device 610 may reside outside of a home network.

With reference to FIG. 6, it can be appreciated that watermark extraction and implementation of applicable screening operations and enforcement actions can be carried out using one or more of the depicted devices in real-time and non-real time applications. Further, the content handling devices that are depicted in FIG. 6 may reside within a network (such as a DLNA-compliant network) that can include a plurality of other server devices, client devices, storage units and the like, that can, directly or indirectly communicate with each other. In addition, the devices that are located within such a network may be in communication with a plurality of other devices that reside outside of the network. In some embodiments, a gateway device 614 may be in communication, through a communication link 612, with one or more of the other devices that are depicted in FIG. 6 and/or other devices that reside within or outside of a home network. The gateway device 614 can, for example, coordinate the operations of various devices to facilitate watermark extraction, transfer of extraction records, authentication operations, communication and/or acquisition of trusted device lists, and the like. Further details regarding the operations of the gateway device 614 will be discussed in the sections that follow.

In some scenarios, a large number of content handling devices, such as the ones that are depicted in FIG. 6, may be in communication with one another to exchange content files or to conduct other operations. However, it is likely that only a subset of such content handling devices have the capability to conduct watermark extraction, evaluate the extraction records against content use policy and/or effect enforcement actions. Therefore, the task remains as to how to properly identify trustworthy devices that have all, or a portion of, such capabilities. It is further necessary to determine the most effective and secure way to distribute the required workload among the various devices, and to conduct various communications between the devices.

Figure 7:
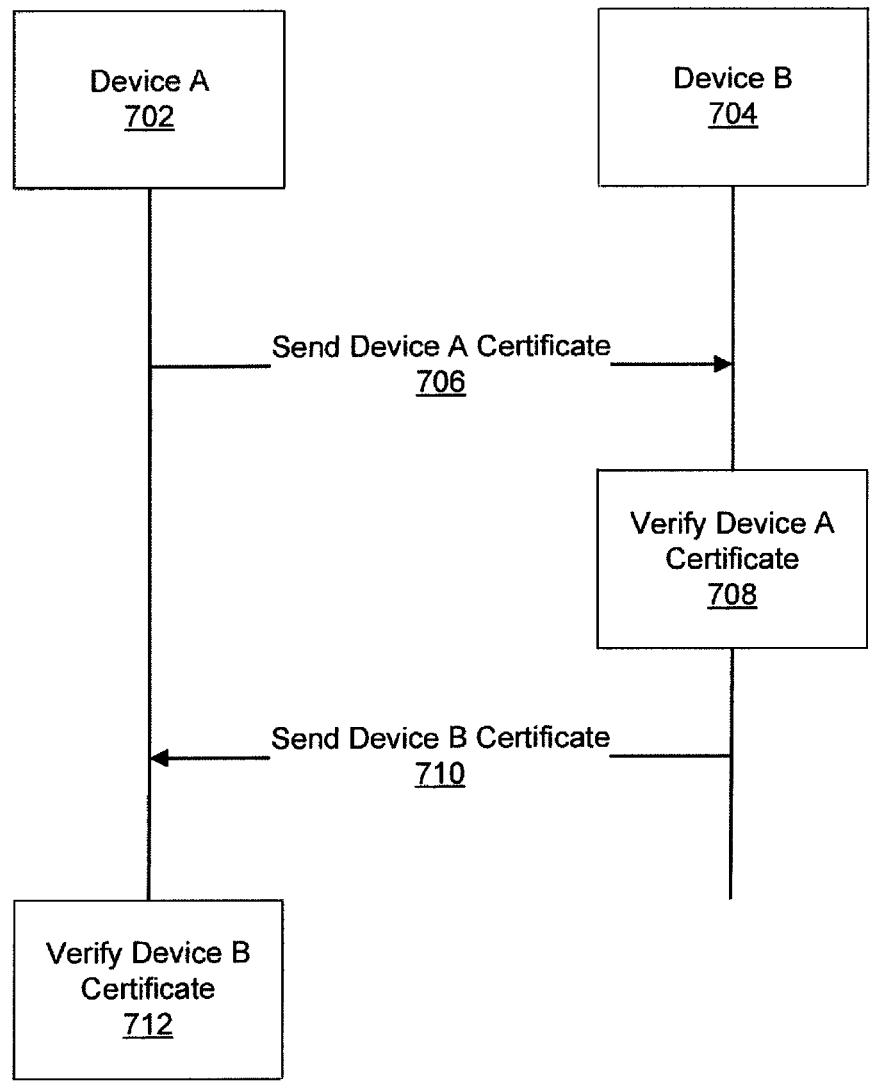
FIG. 7 illustrates an authentication procedure in accordance with an example embodiment.

Device authentication, which is carried out in accordance with the disclosed embodiments, enables each device to verify that another device is a "trusted" device. By establishing the trustworthiness of the devices, the capabilities of each device may be communicated to one another. FIG. 7 illustrates an authentication procedure that may be carried out between Device A 702 and Device B 704 in accordance with an example embodiment. In operation 706, Device A 702 transmits its certificate to Device B 704. In operation 708, Device B 704 verifies the received certificate of Device A 702, thereby determining Device A's trustworthiness, as well as some or all capabilities of Device A 702. In one example, trusted device authentication enables Device B 704 to verify that the certificate provided by Device A 702 is issued from a trusted authority. Analogously, in operation 710, Device B 704 may transmit its certificate to Device A 702. In operation 712, Device A 702 determines if Device B 704 is a trusted device and further ascertains Device B's capabilities. It should be noted that the authentication process can include additional operations that are known in the art. For instance, the authentication process can also include the communication of one or more challenges, and the corresponding responses, between Device A 702 and Device B 704. In some embodiments, these additional operations are conducted to ensure that the communicated information is not being merely copied from cached locations.

In some embodiments, device authentication may be carried out using a DTCP-IP authentication protocol. DTCP-IP specification includes a mandatory Full Authentication and an optional Extended Full Authentication procedure. DTCP-IP uses Advanced Encryption Standard (AES)-128 for content encryption. Both authentication procedures of DTCP-IP employ a public key based Elliptic Curve Digital Signature Algorithm (EC-DSA) for signing and verification. Device Certificate issued by the Digital Transmission Licensing Administrator (DTLA) (i.e., the licensing administrator and developer of DTCP-IP) is stored in the compliant device and used during the authentication process. All compliant devices are also assigned a unique Device ID and device public/private key pair generated by the DTLA. The Device Certificate comprises a plurality of fields that include information regarding certificate format, Device ID, digital signature, DTCP public key and the like. The use of DTCP-IP authentication protocol allows the authenticating device to confirm that the authenticated device is in possession of private keys issued by the DTLA after certifying that the device is compliant.

In one exemplary embodiment, some of the reserved bits associated with a DTCP-IP Device Certificate may be used to signal the device's content screening (e.g., watermark extraction and enforcement) capabilities. Therefore, such a Device Certificate can be used to determine if a device is a trusted device and to obtain information regarding the device's screening capabilities. In other embodiments, additional information such as a location of an extraction record database may be exchanged between the two devices. The devices may further exchange information regarding their processing and storage capabilities.

In another embodiment, device authentication may employ remote attestation to obtain increased assurance that the authenticated device is compliant. Remote attestation employs a cryptographic protocol between the authenticating and authenticated devices to enable the authenticating device to establish that the authenticated device was certified as compliant and has not been modified. The protocol requires that the authenticated device perform specific computations (or "measurements") of its internal processing state (such as computing hashes of data or code or performing timing measurements on its computing operations) whose results provide the authenticating device with certainty that its operation at the time of measurement match those that were performed at the time the device was certified as behaving in a compliant manner. In one exemplary embodiment, remote attestation may be performed using a "hardware root of trust" such as a Trusted Platform Module (TPM) or other secure processing unit. A TPM is a hardware device that can securely store passwords, certificates, encryption keys, and other values in an internal memory and apply a very limited set of cryptographic primitives to those values, based on instructions and other data values received from a more general purpose computer processor such as a CPU. The values stored in internal memory of a TPM are maintained as secret and can only be accessed through the limited cryptographic functions of the TPM. The TPM typically is contained in a separate computer chip from the CPU (such as affixed to the motherboard of a PC) but may also be incorporated into a system-on-a-chip that contains both the TPM and one or more CPU and other hardware functions. Storing this data on the hardware chip, instead of on a computer hard drive or within memory directly accessible by a general purpose CPU enables the establishment of a "hardware root of trust" for the device's behavior and significantly increases the security of the entire platform. This hardware storage location ensures that the stored information is more secure from external software attack and physical theft. TPM provides three kinds of security functionality: 1) secure storage of any data that is encrypted by keys only available to the TPM; 2) measurement and reporting of integrity of platform including BIOS, boot sector, operating system and application software; and 3) authentication of a platform or application-specific data via digital signatures using signing keys that are protected by TPM.

To enable device authentication in a TPM platform, a trusted party (e.g. the Certificate Authority) will sign the signing keys that are protected by TPM. Such certificates that are also protected by TPM are used to prove that a signing key really does belong to a valid TPM. Two devices with TPM-protected certificates and signing keys may carry out the authentication process in the same matter as discussed above based on DTCP-IP authentication. The only difference is that the signing keys in a TPM platform is more secure.

A TPM-enabled device may authenticate another non-TPM-enabled device. Such authentication may result in unequal trustworthiness which then can be used by a service provider to offer distinct services. For example, a high-value content (e.g., a high-definition or an earlier release of a content) may only be delivered to TPM-enabled devices while other content can be delivered to both TMP-enabled and non-TPM-enabled devices.

The TPM contains a number of 160-bit registers called platform configuration registers (PCRs) to measure and report the status of a platform's environment in a trusted matter. Starting from a root of trust, it enables a trusted entity to obtain unforgeable information about the platform state. An executable program can measure another program by computing its hash code and combine the current measurement with the hash value and store the combination in a PCR. Thus, PCRs represent an accumulated measurement of the history of executed programs from power-on to the present. Such a chain of trust provides a powerful defense against malicious programs, such as viruses, spyware and attacks on vulnerable programs. It can also be used to detect and disable unauthorized programs such as pirated software or unlawful programs.

A software media player, especially in a PC environment, has been a weak point in most content protection systems. Extending the chain of trust to the media player on a TPM platform strengthens the security by enabling the detection and further disabling of unauthorized programs and/or modifications to the software player.

TPM can create migratable or non-migratable keys for data encryption. Migratable keys never leave the TPM that creates them while migratable keys can exported to other platforms (devices). Therefore, a content can be locked into a TPM-enabled device by encrypting the content using a TPM-created non-migratable key so that the content can only be decrypted and played on that device. This is understood to be but one approach to performing remote attestation using a "hardware root of trust." However, other methods and devices which are currently known, or may become known in the future, may be used to accomplish the purpose of device authentication.

Based on the assessment of the trusted status of various devices and their capabilities, the various operations that are required to ensure the proper watermark extraction and screening operations associated with a content can be shared among those devices. In order to facilitate the discussion, the operations associated with providing a content from the content server to the content client device (see, e.g., the content server 602 and the content client device 604 of FIG. 6) can be divided into (1) watermark extraction and (2) screening. For example, watermark extraction can include, but is not limited to, the extraction of watermarks, the calculation of content authentication information, the generation of digital signatures, and the storage of the results in a secure location. Screening on the other hand, can include, but is not limited to, the verification of content authenticity, the acquisition and verification of the content use policy and the implementation of enforcement actions (if needed). It is also understood that some overlap between watermark extraction and screening operations can exist. For example, certain operations, such as the acquisition and verification of compliance rules, can be conducted as part of one or both the watermark extraction and the screening operations. Therefore, the above-noted division of operations is merely presented to facilitate understanding of the underlying concepts and is not intended to limit the scope of the disclosed embodiments.

Depending on whether or not a device is trusted (i.e. authenticated as compliant), the extent of availability of computational resources, compliance capability, the required security of operations, architecture and design complexity, the user experience considerations, preferences of the content owners and other factors, watermark extraction and screening operations can be conducted by one or more devices that may reside within and/or outside of a home network. For example, Table 1 provides a listing of how the responsibility of watermark extraction and screening can be shared among the various devices in eight exemplary scenarios.

TABLE 1

Example Division of Operations

| Scenario | Responsible Device(s) | Watermark Extraction | Screening |
|---|---|---|---|
| 1 | Content Client Device | Content Client Device | Content Client Device |
| 2 | Content Client Device | Slave Device | Content Client Device |
| 3 | Content Client Device | Delegated Device | Delegated Device |
| 4 | Content Server | Content Server | Content Server |
| 5 | Content Server | Slave Device | Content Server |
| 6 | Content Server | Delegated Device | Delegated Device |
| 7 | Content Client Device and Content Server | Content Server | Content Client Device |
| 8 | Content Client Device and Content Server | Content Client Device | Content Server |

Table 1 illustrates that, in scenario 1, both the watermark extraction and screening operations are carried out at the content client device while, in scenario 4, both operations are carried out at the content server. In the remaining scenarios, the watermark extraction and screening operations are conducted through cooperation of the content client device, the content server, a delegated device and/or a slave device. In particular, in scenario 2, the content client device invokes a slave device which conducts the watermark extraction. For example, such a slave device can be another trusted content client device or trusted server device with watermark extraction capabilities. In scenario 3, the content client device, which is a trusted device, delegates both the watermark extraction and screening operations to a trusted delegated device. Scenarios 4 through 6 provide analogs of scenarios 1 through 3. But in scenarios 4 through 6 the content server is the responsible device which may undertake the screening operations on its own, invoke a slave device to conduct the screening operations, or delegate these operations to a delegated device. In scenario 7, the content server conducts the watermark extraction operation and the content client device performs the screening. In scenario 8, the content client device conducts the watermark extraction operation and the content server performs the screening.

It can be appreciated that the exemplary listings of Table 1 do not provide an exhaustive listing of all cooperative scenarios. For example, a variation of scenario 7 can be constructed where the watermark extraction is implemented by the content server through invocation of a slave device. As noted earlier, the selection of one or more trusted devices to conduct a particular operation in cooperation with one or more trusted devices can be influenced by a variety of factors, such as the user preferences, complexity of implementation and the like. Table 2 provides an exemplary evaluation of the eight scenarios of Table 1 based on six different factors.

TABLE 2

Exemplary Evaluation of Scenarios 1 to 8

| Scenario | Processing Performance | Integration Complexity for Device Manufacturer | Consumer Experience | Architecture Complexity | Availability of Content in Suitable Format | Overall Preference Rank |
|---|---|---|---|---|---|---|
| S1 | Very Good | Medium | Very Good | High | Yes | 1 |
| S2 | Fair | High | Potential Poor | Medium to High | May be | 7 |
| S3 | Fair | Medium to High | Fair to Good | Medium to High | Likely | 8 |
| S4 | Potential Poor | Medium | Very Good | Low | Likely No | 2 |
| S5 | Fair | High | Potential Poor | Low to Medium | May Be | 6 |
| S6 | Fair to Good | Medium to High | Fair to Good | Low to Medium | Likely | 4 |
| S7 | Potential Poor | Medium | Very Good | Low | Likely No | 5 |
| S8 | Very Good | medium | Very Good | High | Yes | 3 |

The exemplary evaluations of Table 2 provide a rough assessment of the merits for each configuration of devices in scenarios 1 through 8. Table 2 further includes a limited number of factors for illustration purposes. However, it is understood that additional factors, such as computational load and memory capabilities of each device, preferences of the content owner and the like, can also be considered in making an assessment of each scenario. The right-most column of Table 2 provides an overall preference ranking for each scenario. This overall ranking may be produced by considering all the evaluated items that are listed in Table 2 and/or additional factors that are not listed in Table 2. In one embodiment, such an overall preference ranking is used as a default setting, which prescribes a particular configuration of devices in the absence specific instructions that favors other configurations.

A review of Table 2 reveals that, even if both the content server and the content client device are capable of performing watermark extraction and/or screening operation, it may be preferred to assign certain operations to one or both of the devices (or even a third device such as a delegated or slave device) to accommodate particular preferences. In accordance with the disclosed embodiments, if both the client content device and the content server are trusted entities, then they can ascertain the capabilities of one another, and decide how to most effectively conduct the watermark extraction and screening operations. If only one of the devices is a trusted device, then that device must determine how to independently, or in cooperation with other trusted devices, carry out the necessary watermark extraction and screening operations.

Figure 8:
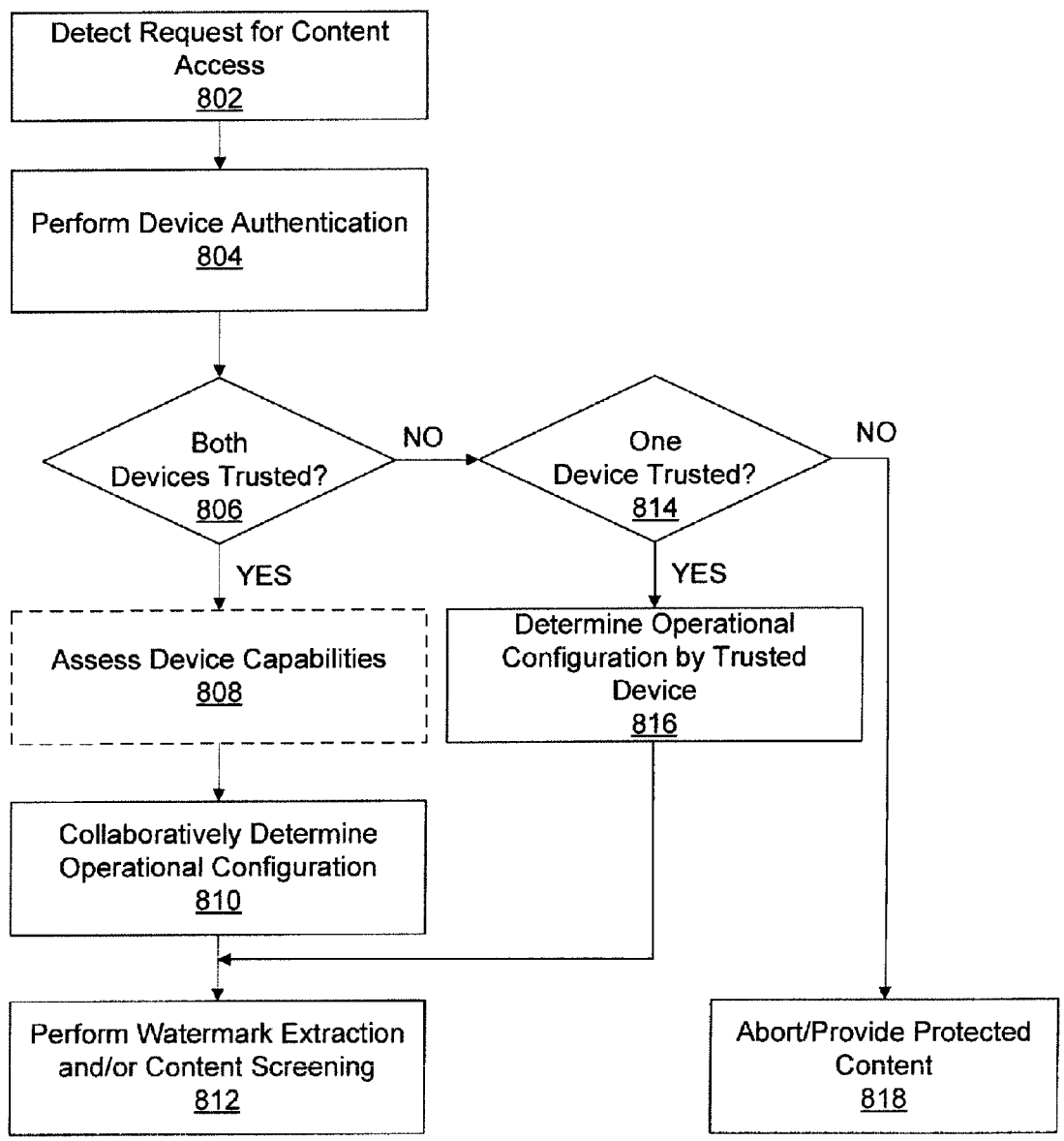
FIG. 8 illustrates collaborative watermark extraction and content screening operation in accordance with an example embodiment.

FIG. 8 is a flow diagram associated with watermark extraction and screening operations that are conducted in a collaborative fashion in accordance with an exemplary embodiment. At 802, a request for access to a content is detected. Such a request is typically initiated by a content client device and is directed to a content server. However, in some examples, the requests may be communicated between content client devices, content servers and/or other devices. At 804, in response to the detection of a request for access to the content, device authentication is performed. For example, a device authentication that was described in connection with FIG. 7 may be performed to determine the trusted status of the devices and to obtain certain device capabilities. If it is determined, at 806, that both devices are trusted (i.e., "YES" at 806), certain device capabilities may be optionally exchanged between the two trusted devices at 808. As noted earlier, some or all of the device capabilities may be exchanged during device authentication step at 804. However, in some embodiments, device authentication and acquisition of device capabilities may be conducted in separate steps. For example, certain device capabilities, such as whether or not a device can perform watermark extraction or screening, can be ascertained during the authentication step (i.e., at 804), while other device capabilities, such as whether or not a device has spare computational resources to conduct additional operations, are ascertained during a subsequent information exchange operation (i.e., at 808).

Referring back to FIG. 8, at 810, the two devices collaboratively determine the proper operational configuration. This step allows the division of labor between the two trusted devices (and/or additional trusted devices) based on a desired criterion. For example, an operational configuration that correspond to one of scenarios S1 through S8 (see Table 1) can be selected based on a preference that is listed in Table 2. Alternatively, an available operational configuration may be selected with the highest overall preference ranking. At 812, watermark extraction and/or content screening operations are conducted by the appropriate devices that were selected at 810. It should also be noted that content screening operations at 812 may simply comprise receiving an existing watermark extraction record from a trusted device (or from a secure storage location that is known to a trusted device) and conducting screening in accordance with the received extraction record (e.g., see steps 212 to 218 of FIG. 2). In other embodiments, where a pre-existing watermark extraction record does not exist (or cannot be accessed), watermark extraction and/or content screening operations can be performed, at 812, by one or more trusted devices.

If, at 806 in FIG. 8, the determination is "NO", the process moves to 814, where it is determined if only one device is trusted. Such a determination can be made when, for example, a trusted content client device fails to authenticate a content server. Alternatively, as will be described in the sections that follow, a central authority can make such a determination. If only one device is trusted (i.e., "YES" at 814), the trusted device determines the proper configuration for conducting the watermark extraction and/or screening operations, at 816. In doing so, the trusted device may utilize the services of other trusted devices inside or outside of the home network. Upon determining the proper configuration, the process moves to 812, where watermark extraction and/or content screening operations are conducted. If, at 814, it is determined that none of the devices are trusted (i.e., "NO" at 814), the process may be aborted (e.g., content access is denied) at 818. Alternatively, the content may be provided in a protected format (e.g., in encrypted format). In some embodiments, the content is delivered in a degraded format. In still other embodiments, only a part of the content is delivered.

The operations that are described in FIG. 8 may be repeated, at least in-part, when each device within a home network is attempting to acquire a content, to provide a content, or solicit screening services/information from another device within the home network. Further, the above noted operations may also be carried out when at least one of the devices resides outside of the home network, if a mechanism for authentication between the devices inside and outside of the network exists.

Table 3 provides an exemplary listing of device configuration possibilities that is organized based on the trusted status of the two devices and the availability of watermark extraction and screening capabilities at the two devices. S1 through S8 represent the device configurations that were previously discussed in connection with the exemplary scenarios 1 through 8, respectively.

content client device 908 may be able to use the protected content, if, for example, it has acquired the necessary decryption capability. Such a capability can be acquired, for example, illegally (e.g., a device is hacked or encryption keys are stolen), or legally (e.g., if the content owner decides to temporarily grant the capability to a non-compliant client device 908).

Referring back to FIG. 9, the unprotected content, at 912, may be delivered from the compliant content server 902 to the compliant content client device 906, which performs the watermark extraction and/or screening operations. An unprotected content may also be delivered, at 916, from the non-compliant content server 904 to the compliant content client device 906, which screens the content. The compliant content

TABLE 3

Operational Configuration Possibilities based on Screening Capabilities

| | | | | Content Client Device | | | | |
|---|---|---|---|---|---|---|---|---|
| | | | | Trusted | | | | |
| | | | | Watermark Extraction Available | | Watermark Extraction Not Available | | |
| | | | | Screening Available | Screening Not Available | Screening Available | Screening Not Available | Not Trusted |
| Content Server | Trusted | Watermark Extraction Available | Screening Available | S1, S2, S3, S4, S5, S6, S7, S8 | S3, S4, S5, S6, S8 | S2, S3, S4, S5, S6, S7 | S3, S4, S5, S6 | S4, S5, S6 |
| | | | Screening Not Available | S1, S2, S3, S6, S7 | S3, S6 | S2, S3, S6, S7 | S3, S6 | S6 |
| | | Watermark Extraction Not Available | Screening Available | S1, S2, S3, S5, S6, S8 | S3, S5, S6, S8 | S2, S3, S5, S6 | S3, S5, S6 | S5, S6 |
| | | | Screening Not Available | S1, S2, S3, S6 | S3, S6 | S2, S3, S6 | S3, S6 | S6 |
| | Not trusted | | | S1, S2, S3 | S3 | S2, S3 | S3 | N/A |

Table 3 illustrates the availability of different operational configurations based on the trusted status of each device and the available screening capabilities in accordance with an exemplary embodiment. Once it is determined which of the operational configurations are available, a particular configuration can be selected to effect the desired screening operations. For example, as noted earlier, a configuration that provides the best overall preference ranking may be selected.

Figure 9:
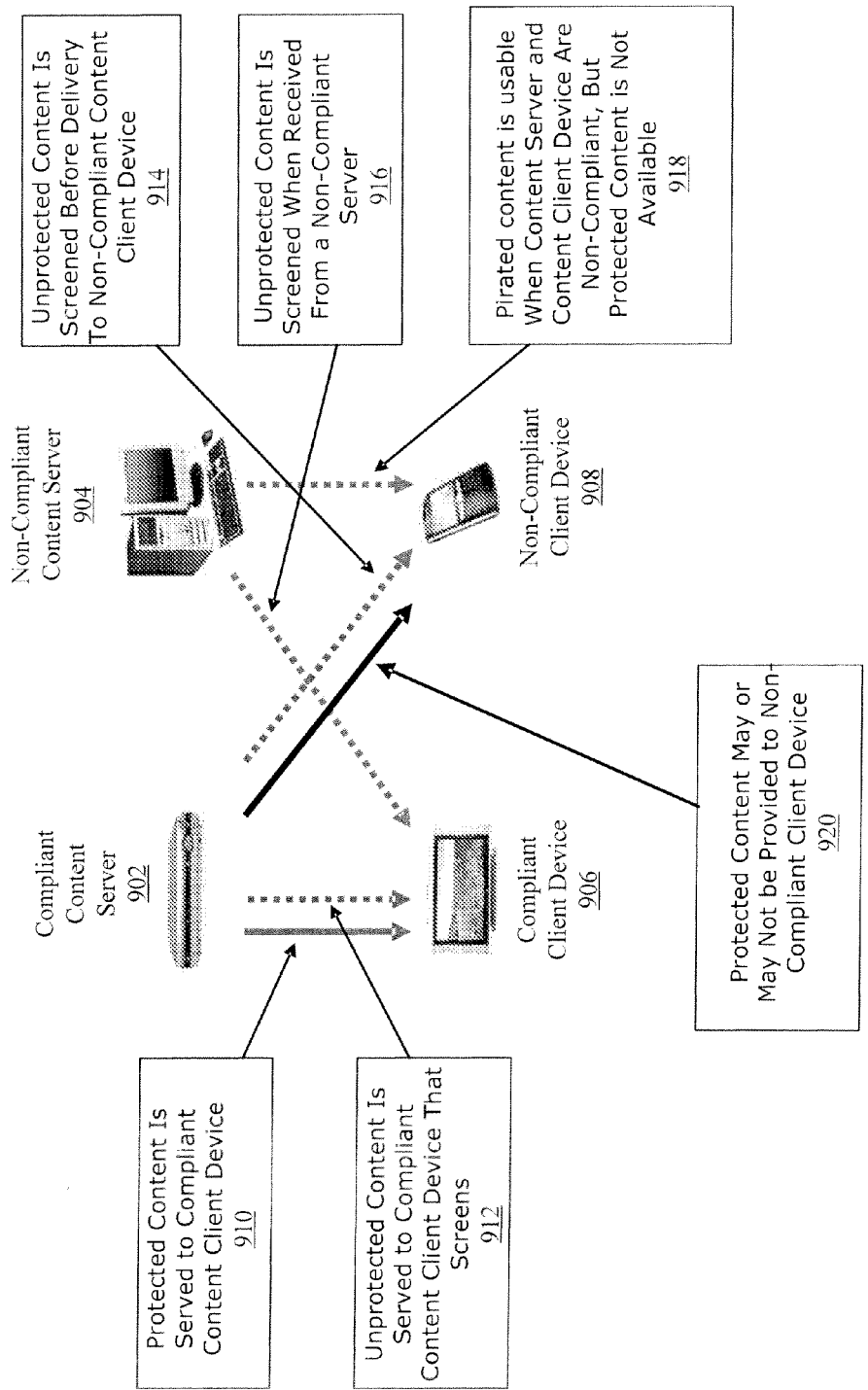
FIG. 9 illustrates a block diagram of a content distribution architecture in accordance with an example embodiment.

By providing watermark extraction and screening capabilities to various devices and at various points of content distribution, secure distribution of content can be enabled. Separation of watermark extraction and screening operations further facilitates the proliferation of "compliant" devices with limited computational resources (such as mobile devices). Such compliant devices are trusted devices that can, for example, implement only a portion of watermark extraction and/or screening capabilities, and rely on other devices to provide the remaining operational capabilities. FIG. 9 is an exemplary diagram of different content distribution scenarios involving a compliant content server 902, a non-compliant content server 904, a compliant content client device 906, a non-compliant content client device 908, as well as protected and unprotected content. A protected content can be protected by a content protection mechanism, such as encryption. In such a scenario, as illustrated at 910, the protected content can be played by, and is thus delivered to, a compliant content client device 906 that is capable of decrypting the content. This is illustrated at 910. However, it should be noted that such a protected content may also be delivered to, at 920, the non-compliant content client device 908. The non-compliant device 906 may employ one of the previously noted cooperative methods to efficiently screen the unprotected content. FIG. 9 also illustrates that an unprotected content may be delivered, at 914, from the compliant content server 902 to a non-compliant client content device 908. In this scenario, the compliant content server 902 performs the necessary watermark extraction and screening prior to delivering the content.

The exemplary content delivery architecture that is depicted in FIG. 9 also accounts for the delivery, at 918, of an unprotected content (e.g., a pirated content) from the non-compliant content server 904 to the non-compliant content client device 908. As noted earlier, to reduce the likelihood of unauthorized content use, the proliferation of compliant content client devices may be encouraged by providing incentives to the content users. Further, blocking the delivery of protected content (or delivery of a partial content), at 920, to a non-compliant client device 908 can encourage the user to acquire a compliant device. Such an upgrade is facilitated in accordance with the disclosed embodiments, since the non-compliant content client device 908 may only be required to acquire some or all of the screening capabilities. Acquisition of such screening capabilities enables the device to receive protected content (e.g., at 920). In addition, through the use of cooperative extraction methods described earlier, the device can receive and screen unprotected content from a non-compliant content server 904.

As discussed earlier, it is possible that the compliant device, e.g. 902 or 906, does not have the appropriate codecs that are required to perform watermark extraction and/or screening of a content that is encoded in a specific media format. One of the following polices may be applied to this situation: 1) stop the transfer or use of the content; 2) use one of the invocation or delegation models to conduct the watermark extraction and/or screening; 3) allow the limited or unlimited transfer or use of the content (the limitations may include a maximum number of times that such transfer or usage is allowed).

In another embodiment that is particularly applicable to centralized architectures, cooperative watermark extraction in accordance with the disclosed embodiment may be implemented in situations where a special trusted device (e.g., a "gateway" 614 that is depicted in FIG. 6) coordinates and controls other devices to enable content sharing and consumption, as well as watermark extraction, screening and digital rights management. As such, the gateway device may coordinate watermark extraction, transfer of extraction records, authentication operations, communication and/or acquisition of trusted device lists, and the like. The gateway device typically resides inside of a home network (e.g., a DLNA-compliant network). In some embodiments, the communications between the gateway and the various devices are encrypted.

The gateway device, which may be controlled directly by a service provider, can be responsible for assigning watermark extraction tasks to one or more capable and trusted devices in a home network. For example, the gateway device can be the only device that is authorized to acquire and decrypt a protected content and/or to serve such a protected content in a home network. The gateway device may further be able to control a compliant content server for content discovery, exposure, serving and transport. The gateway device can also control a compliant content client device for content rendering.

In another example, the gateway device may be, additionally or alternatively, responsible for determining the appropriate operational configurations that are necessary to conduct the various screening operations. The gateway device may also direct and synchronize the trusted devices to conduct the screening operations. For example, the gateway may use one of the invocation and delegation models to effect the necessary screening operations. In some embodiments, trusted device authentication operations may also be conducted by the gateway device. Additionally, the gateway device may maintain a revocation list and may have the authority to revoke the trusted status of a device within the network. Further, the gateway device may retain the content use policy associated with different embedded watermarks. Such content use policy may be used to prescribe various enforcement actions. Such content use policy may also be communicated to various trusted devices. The gateway device may also control screening and update the content use policy for policy enforcement.

In still other embodiments, the gateway device may be in communication with one or more external device (e.g., another gateway device, a content server device, a content client device, etc.) that reside outside of the home network. In these embodiments, the gateway device may control the flow of content, authentication information and other information between the home network and the external devices.

According to some embodiments, all watermark extraction records may be stored in a central location that is accessible by the gateway. The watermark extraction records may additionally be duplicated on other devices on a home network. Further improvements in screening efficiency can be achieved by secure and private exchange of watermark extraction records. The exchange must be conducted between trusted devices either within the home network (e.g., a DLNA-compliant network) or from a cloud space via Internet. Exchange of extraction records may occur during the authentication of two devices so that the security, including confidentiality and integrity, is ensured. For example, using the DTCP-IP's authentication protocol, any information (such as the extraction records) can be securely exchanged between the two devices.

A need for the exchange of extraction records between two devices may arise if one of the devices does not have the extraction records. In this scenario, the records may be copied from one device onto the other device. In another scenario, an exchange of records may be necessary to merge and synchronize the records of both devices. In these situations, the exchange of records may be conducted in the following manner. If an extraction record of a content item identified by its file name or hash code on the first device does not exist in the records on the second device, the missing record can be added to the second device (and vice verse). If, on the other hand, a record for the same content item exists on both devices, the record with the latest date and time stamp (e.g., last modification date and time is used to synchronize the contents of the two devices.

When the extraction records associated with a user are kept in the cloud, they can be considered as part of a central "virtual records" repository which allows or denies the user to render a content. These virtual records can be organized in several ways. In one example embodiment, each user has a private virtual locker in the cloud for the extraction records corresponding to the content files in his/her home network. The advantage of this configuration is that the user can ubiquitously access the records to receive permissions to render his/her content. In another example embodiment, all virtual records from all users (e.g., all users in a geographic region or all users of a service provider) are stored in a universal locker. The extraction records can be indexed by the hash code. Thus, only one record is needed to be stored in the cloud for a content item, from which a unique hash code can be produced. One advantage of such organization is that these records are anonymous and less redundant.

In some embodiments, only a portion of the extraction records is stored in the cloud. In one example, only the extraction records that correspond to successful content access requests are stored in the cloud. In another example, only the extraction records that correspond to unsuccessful content access requests are stored in the cloud. In other embodiments, the privacy of the users is protected by either using a trusted service or by obfuscating the source of the query. In still other embodiments, certain users are given enhanced privileges to facilitate access and exchange of extraction records. For example, such privileges may be granted to users with no record of unsuccessful content access requests, whereas users with a history of unsuccessful content access requests may have to accept some delays associated with additional authentication and verification operations.

Figure 10:
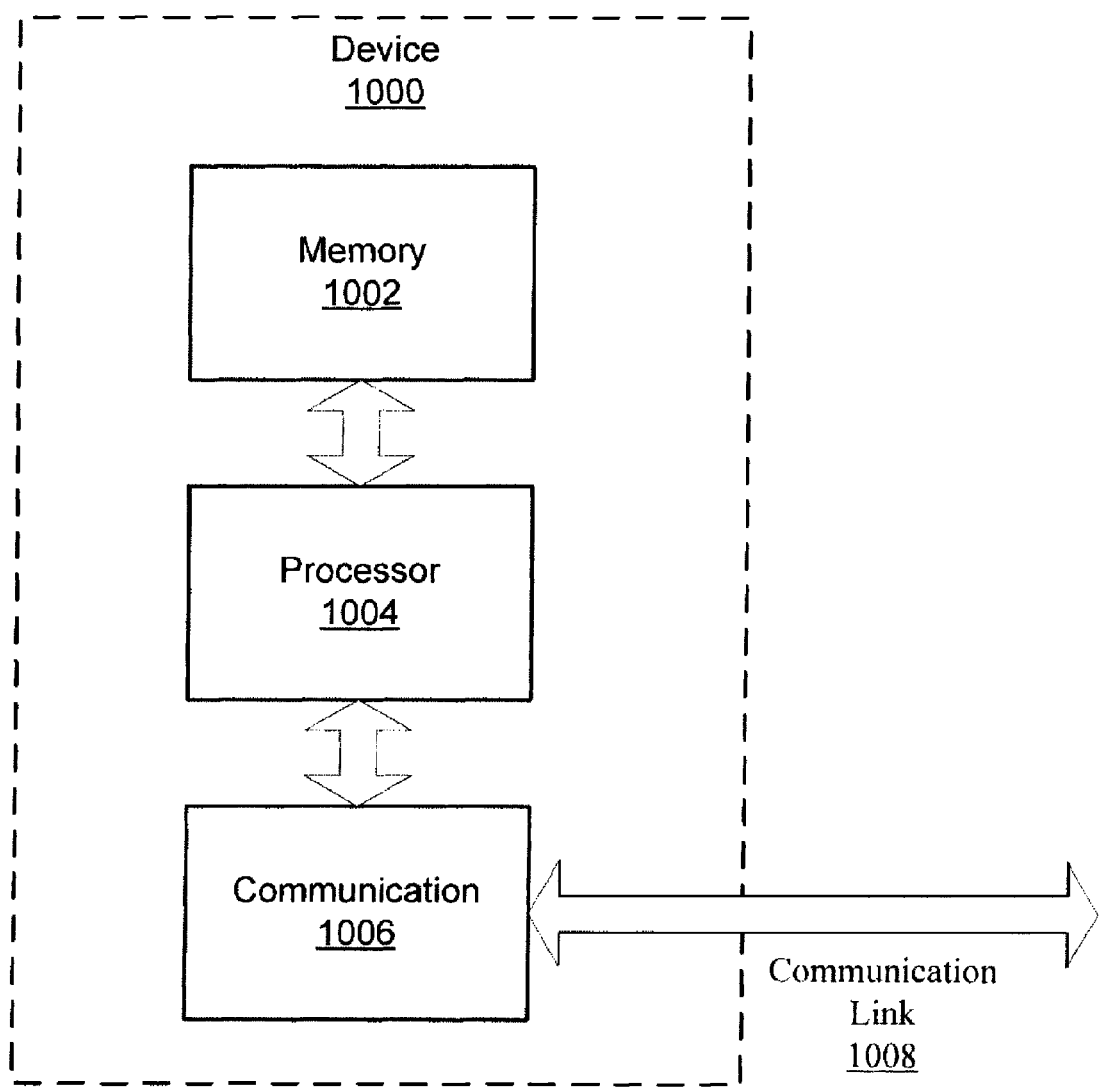
FIG. 10 illustrates a block diagram of an exemplary device that can accommodate the disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 10 illustrates a block diagram of a device 1000 within which the various disclosed embodiments may be implemented. The device 1000 comprises at least one processor 1002 and/or controller, at least one memory 1004 unit that is in communication with the processor 1002, and at least one communication unit 1006 that enables the exchange of data and information, directly or indirectly, through the communication link 1008 with other entities, devices and networks. The communication unit 1006 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The exemplary device 1000 that is depicted in FIG. 10 may be integrated into as part of a content handling device 100, a master device 404, a slave device 412, a delegating device 504, a delegated device 510 and/or a destination device 506 that are depicted in FIGS. 1, 4 and 5.

Referring back to FIG. 1, any one of the watermark extractor 104, the digital signature generator 106, the encryption component 108, the authentication component 120 and the like may be implemented in software, hardware, firmware, or combinations thereof. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising:
retrieving a pre-existing watermark extraction record associated with a content in response to detection of an operation in a content handling device, wherein the operation requires access to a content, the pre-existing watermark extraction record having been produced, prior to the detection of the operation, by extracting watermarks that are embedded in the content and storing watermark extraction results in a non-transitory storage medium, thereby allowing watermark extraction to be bypassed when the content is subsequently accessed;
upon successful retrieval of the pre-existing watermark extraction record, bypassing watermark extraction from the content and authenticating the content using the pre-existing watermark extraction record; and
effecting content screening in accordance with a content use policy associated with the content.

2. The method of claim 1, wherein the operation comprises at least one of:
a copying operation;
a transferring operation;
a rendering operation;
a playback operation; and
a recording operation.

3. The method of claim 1, wherein the pre-existing watermark extraction record is retrieved from a location outside of the content handling device.

4. The method of claim 1, wherein the pre-existing watermark extraction record is retrieved from the content handling device.

5. The method of claim 3, wherein the location is at least one of:
a private virtual locker on a cloud;
a universal virtual locker on a cloud;
a storage location within a digital living network alliance (DLNA) compliant device;
a storage location within a digital living network alliance (DLNA) compliant network;
a storage location within another device that is communicatively connected to the content handling device; and
a removable computer-readable storage medium.

6. The method of claim 1, wherein the pre-existing watermark extraction record comprises at least one of:
an extracted watermark payload;
a number of extracted watermarks;
a time stamp associated with an extracted watermark;
a content authentication information;
a digital signature associated with the extraction record;
the usage rules associated with the content; and
an action associated with the content use policy and an extracted watermark payload.

7. The method of claim 1, wherein
at least one of the retrieval of the pre-existing watermark extraction record and authentication of the content fails; and
the content is subjected to a new watermark extraction operation.

8. The method of claim 7, further comprising producing a new watermark extraction record.

9. The method of claim 7, wherein the content use policy prescribes an action in accordance with a result of the new watermark extraction operation.

10. The method of claim 9, wherein the prescribed action is stored as part of new watermark extraction record.

11. The method of claim 1, wherein the content use policy prescribes an enforcement action in accordance with the pre-existing watermark extraction record.

12. The method of claim 1, wherein the content screening comprises at least one of:
- muting at least a portion of the content;
- blanking at least a portion of the content;
- displaying a copyright notice;
- denying access to the content;
- deleting the content;
- recording content usage information in the content handling device;
- sending content usage information to a remote server;
- playback or display of at least an advertisement stored locally or transmitted from a remote server;
- playback or display of a reduced resolution of the content;
- contacting a remote server for permission to access the content; and
- fulfilling a payment transaction with a remote server.

13. The method of claim 1, wherein the content handling device is digital living network alliance (DLNA) compliant device.

14. The method of claim 1, wherein
the operation requires real-time access to the content;
the pre-existing watermark extraction record comprises a segmented authentication information corresponding to a plurality of contents; and
the authentication is carried out for at least a segment of the content in accordance with the segmented authentication information.

15. The method of claim 14, wherein the pre-existing watermark extraction record accompanies a streaming content.

16. The method of claim 14, wherein the segmented authentication information comprises a segmented hash value.

17. The method of claim 14, wherein the authentication is carried out for sequential segments of the content.

18. The method of claim 14, wherein the authentication is carried out for nonsequential segments of the content.

19. The method of claim 1, wherein the content screening is effected by evaluating the information contained within the pre-existing watermark extraction record in conjunction with content use information associated with a predetermined time period.

20. The method of claim 19, wherein the content use information comprises an extracted watermark payload and an associated time stamp within a time interval immediately preceding the time when the operation is detected.

21. The method of claim 1, wherein
the operation requires access to a plurality of contents;
one or more of the plurality of the contents have a size below a particular threshold; and
the content screening is effected by:
concatenating the plurality of the contents with a size below the particular threshold;
conducting a new watermark extraction operation on the concatenated content;
aggregating the results associated with the new watermark extraction operation and the information obtained from the pre-existing watermark extraction record that correspond to one or more of the plurality of the contents with a size above or equal to the particular threshold; and
producing an action in accordance the aggregated results.

22. A device, comprising:
a processor; and
a memory, including processor executable code, the processor executable code when executed by the processor configures the device to:
retrieve a pre-existing watermark extraction record associated with a content in response to detection of an operation in a content handling device, wherein the operation requires access to a content, the pre-existing watermark extraction record having been produced, prior to the detection of the operation, by extracting watermarks that are embedded in the content and storing watermark extraction results in a non-transitory storage medium, thereby allowing watermark extraction to be bypassed when the content is subsequently accessed;
upon successful retrieval of the pre-existing watermark extraction record, bypass watermark extraction from the content and authenticate the content using the pre-existing watermark extraction record; and
effect content screening in accordance with a content use policy associated with the content.

23. The device of claim 22, wherein the operation comprises at least one of:
a copying operation;
a transferring operation;
a rendering operation;
a playback operation; and
a recording operation.

24. The device of claim 22, wherein the processor executable code when executed by the processor configures the device to retrieve the pre-existing watermark extraction record from a location outside of the content handling device.

25. The device of claim 22, wherein the processor executable code when executed by the processor configures the device to retrieve the pre-existing watermark extraction record from the content handling device.

26. The device of claim 24, wherein the location is at least one of:
a private virtual locker on a cloud;
a universal virtual locker on a cloud;
a storage location within a digital living network alliance (DLNA) compliant device;
a storage location within a digital living network alliance (DLNA) compliant network;
a storage location within another device that is communicatively connected to the content handling device; and
a removable computer-readable storage medium.

27. The device of claim 22, wherein the pre-existing watermark extraction record comprises at least one of:
an extracted watermark payload;
a number of extracted watermarks;
a time stamp associated with an extracted watermark;
a content authentication information;
a digital signature associated with the extraction record;
the usage rules associated with the content; and
an action associated with the content use policy and an extracted watermark payload.

28. The device of claim 22, wherein the processor executable code when executed by the processor configures the device to subject the content to a new watermark extraction operation upon failure of at least one of the retrieval of the pre-existing watermark extraction record and authentication of the content.

29. The device of claim 28, further wherein the processor executable code when executed by the processor further configures the device to produce a new watermark extraction record.

30. The device of claim 28, wherein the content use policy prescribes an action in accordance with a result of the new watermark extraction operation.

31. The device of claim 30, wherein the prescribed action is stored as part of new watermark extraction record.

32. The device of claim 22, wherein the content use policy prescribes an enforcement action in accordance with the pre-existing watermark extraction record.

33. The device of claim 22, wherein the content screening comprises at least one of:
muting at least a portion of the content;
blanking at least a portion of the content;
displaying a copyright notice;
denying access to the content;
deleting the content;
recording content usage information in the content handling device;
sending content usage information to a remote server;
playback or display of at least an advertisement stored locally or transmitted from a remote server;
playback or display of a reduced resolution of the content;
contacting a remote server for permission to access the content; and fulfilling a payment transaction with a remote server.

34. The device of claim 22, wherein the content handling device is digital living network alliance (DLNA) compliant device.

35. The device of claim 22, wherein
the operation requires real-time access to the content;
the pre-existing watermark extraction record comprises a segmented authentication information corresponding to a plurality of content segments; and
the processor executable code when executed by the processor configures the device to authenticate at least a segment of the content in accordance with the segmented authentication information.

36. The device of claim 35, wherein the pre-existing watermark extraction record accompanies a streaming content.

37. The device of claim 35, wherein the segmented authentication information comprises a segmented hash value.

38. The device of claim 35, wherein the processor executable code when executed by the processor configures the device to authenticate sequential segments of the content.

39. The device of claim 35, wherein the processor executable code when executed by the processor configures the device to authenticate non-sequential segments of the content.

40. The device of claim 22, wherein the processor executable code when executed by the processor configures the device to effect content screening by evaluating the information contained within the pre-existing watermark extraction record in conjunction with content use information associated with a predetermined time period.

41. The device of claim 40, wherein the content use information comprises an extracted watermark payload and an associated time stamp within a time interval immediately preceding the time when the operation is detected.

42. The device of claim 22, wherein
the operation requires access to a plurality of contents;
one or more of the plurality of the contents have a size below a particular threshold; and
the content screening is effected by the processor executable code, when executed by the processor, configuring the device:
concatenate the plurality of the contents with a size below the particular threshold;
conduct a new watermark extraction operation on the concatenated content;
aggregate the results associated with the new watermark extraction operation and the information obtained from the pre-existing watermark extraction record that correspond to one or more of the plurality of the contents with a size above or equal to the particular threshold; and
produce an action in accordance the aggregated results.

43. A computer program product, embodied on a non-transitory computer readable medium, comprising:
computer code for retrieving a pre-existing watermark extraction record associated with a content in response to detection of an operation in the content handling device, wherein the operation requires access to a content, the pre-existing watermark extraction record having been produced, prior to the detection of the operation, by extracting watermarks that are embedded in the content and storing watermark extraction results in a non-transitory storage medium, thereby allowing watermark extraction to be bypassed when the content is subsequently accessed;
computer code for upon successful retrieval of the pre-existing watermark extraction record, bypassing watermark extraction from the content and authenticating the using the pre-existing watermark extraction record; and
computer code for effecting content screening in accordance with a content use policy associated with the content.

44. A device, comprising:
means for retrieving a pre-existing watermark extraction record associated with a content in response to detection of an operation in the content handling device, wherein the operation requires access to a content, the pre-existing watermark extraction record having been produced, prior to the detection of the operation, by extracting watermarks that are embedded in the content and storing watermark extraction results in a non-transitory storage medium, thereby allowing watermark extraction to be bypassed when the content is subsequently accessed;
means for upon successful retrieval of the pre-existing watermark extraction record, bypassing watermark extraction from the content and authenticating the content using the pre-existing watermark extraction record; and
means for effecting content screening in accordance with a content use policy associated with the content.

* * * * *